US009390369B1

(12) United States Patent
Sinyavskiy et al.

(10) Patent No.: US 9,390,369 B1
(45) Date of Patent: Jul. 12, 2016

(54) MULTITHREADED APPARATUS AND METHODS FOR IMPLEMENTING PARALLEL NETWORKS

(71) Applicant: Brain Corporation, San Diego, CA (US)

(72) Inventors: Oleg Sinyavskiy, San Diego, CA (US); Jonathan James Hunt, San Diego, CA (US)

(73) Assignee: Brain Corporation, San Diego, CA (US)

( * ) Notice: Subject to any disclaimer, the term of this patent is extended or adjusted under 35 U.S.C. 154(b) by 299 days.

(21) Appl. No.: 13/895,163

(22) Filed: May 15, 2013

(51) Int. Cl.
*G06N 3/06* (2006.01)
*G06N 3/04* (2006.01)

(52) U.S. Cl.
CPC ........................................ *G06N 3/06* (2013.01)

(58) Field of Classification Search
None
See application file for complete search history.

(56) References Cited

U.S. PATENT DOCUMENTS

| | | | |
|---|---|---|---|
| 5,325,530 A | 6/1994 | Mohrmann | |
| 5,918,229 A | 6/1999 | Davis et al. | |
| 9,008,840 B1* | 4/2015 | Ponulak et al. | 700/250 |
| 9,015,092 B2* | 4/2015 | Sinyavskiy et al. | 706/25 |
| 2009/0037926 A1 | 2/2009 | Dinda et al. | |
| 2010/0241881 A1 | 9/2010 | Barsness et al. | |
| 2012/0084241 A1 | 4/2012 | Friedman et al. | |
| 2012/0265835 A1 | 10/2012 | Archer et al. | |
| 2013/0073497 A1 | 3/2013 | Akopyan et al. | |
| 2013/0073733 A1 | 3/2013 | Archer et al. | |
| 2013/0325766 A1* | 12/2013 | Petre et al. | 706/15 |
| 2013/0325777 A1* | 12/2013 | Petre et al. | 706/26 |
| 2013/0339281 A1* | 12/2013 | Datta et al. | 706/29 |
| 2014/0032458 A1* | 1/2014 | Sinyavskiy et al. | 706/16 |
| 2014/0032459 A1* | 1/2014 | Sinyavskiy et al. | 706/16 |

(Continued)

FOREIGN PATENT DOCUMENTS

| | | |
|---|---|---|
| EP | 0653863 | 5/1995 |
| EP | 0639908 | 12/2002 |
| WO | WO02/41661 | 5/2002 |

OTHER PUBLICATIONS

Ananthanarayanan et al, The Cat is Out of the Bag: Cortical Simulations with 10^9 Neurons, 10^13 Synapses, 2009.*

(Continued)

*Primary Examiner* — Stanley K Hill
*Assistant Examiner* — Mikayla Chubb
(74) *Attorney, Agent, or Firm* — Gazdzinski & Associates, PC

(57) ABSTRACT

Apparatus and methods for developing parallel networks. In some implementations, a network may be partitioned into multiple partitions, wherein individual portions are being executed by respective threads executed in parallel. Individual portions may comprise multiple neurons and synapses. In order to reduce cross-thread traffic and/or reduce number of synchronization locks, network may be partitioned such that for given network portion, the neurons and the input synapses into neurons within the portion are executed within the same thread. Synapse update rules may be configured to allow memory access for postsynaptic neurons and forbid memory access to presynaptic neurons. Individual threads may be afforded pairs of memory buffers configured to effectuate asynchronous data input/output to/from thread. During an even iteration of network operation, even buffer may be utilized to store data generated by the thread during even iteration. Odd buffer may be utilized to read data, generated by other threads during the preceding odd iteration.

19 Claims, 18 Drawing Sheets

(56) References Cited

U.S. PATENT DOCUMENTS

| | | | |
|---|---|---|---|
| 2014/0081895 A1* | 3/2014 | Coenen et al. | 706/25 |
| 2014/0114975 A1* | 4/2014 | Rouat et al. | 707/737 |
| 2014/0156574 A1* | 6/2014 | Piekniewski et al. | 706/15 |
| 2014/0193066 A1* | 7/2014 | Richert | 382/158 |
| 2014/0229411 A1* | 8/2014 | Richert et al. | 706/16 |
| 2014/0244557 A1* | 8/2014 | Piekniewski et al. | 706/16 |
| 2014/0277718 A1* | 9/2014 | Izhikevich et al. | 700/250 |
| 2014/0317035 A1* | 10/2014 | Szatmary et al. | 706/27 |

OTHER PUBLICATIONS

Carillo et al, A real-time spiking cerebellum model for learning robot control, 1999.*

Masuta et al, Perceptual System using Spiking Neural Network for an Intelligent Robot, 2010.*

* cited by examiner

MULTITHREADED APPARATUS AND METHODS FOR IMPLEMENTING PARALLEL NETWORKS

CROSS-REFERENCE TO RELATED APPLICATIONS

This application is related to co-owned and co-pending U.S. patent application Ser. No. 13/875,225, entitled "ABSTRACT SYNTAX TREE APPARATUS AND METHODS FOR PARALLEL NETWORKS" filed May 1, 2013, co-pending U.S. patent application Ser. No. 13/875,234, entitled "APPARATUS AND METHODS FOR DEVELOPING PARALLEL NETWORKS USING A GENERAL PURPOSE PROGRAMMING LANGUAGE" filed May 1, 2013, co-pending U.S. patent application Ser. No. 13/239,123, filed Sep. 21, 2011, and entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL," U.S. patent application Ser. No. 13/239,148, filed Sep. 21, 2011, and entitled "ELEMENTARY NETWORK DESCRIPTION FOR EFFICIENT LINK BETWEEN NEURONAL MODELS AND NEUROMORPHIC SYSTEMS," now patented as U.S. Pat. No. 8,712,941 on Apr. 29, 2014, U.S. patent application Ser. No. 13/239,155, filed Sep. 21, 2011, and entitled "ELEMENTARY NETWORK DESCRIPTION FOR EFFICIENT MEMORY MANAGEMENT IN NEUROMORPHIC SYSTEMS", now patented as U.S. Pat. No. 8,725,658 on May 13, 2014, U.S. patent application Ser. No. 13/239,163, filed Sep. 21, 2011, and entitled "SYSTEM AND METHODS FOR PROVIDING A NEURAL NETWORK HAVING AN ELEMENTARY NETWORK DESCRIPTION FOR EFFICIENT IMPLEMENTATION OF EVENT-TRIGGERED PLASTICITY RULES," now patented as U.S. Pat. No. 8,719,199 on May 6, 2014. U.S. patent application Ser. No. 13/385,938, entitled "TAG-BASED APPARATUS AND METHODS FOR NEURAL NETWORKS", filed Mar. 15, 2012, and now patented as U.S. Pat. No. 8,712,939 on Apr. 29, 2014, co-pending U.S. patent application Ser. No. 13/385,933, entitled "HIGH LEVEL NEUROMORPHIC NETWORK DESCRIPTION APPARATUS AND METHODS", filed Mar. 15, 2012, and co-pending U.S. patent application Ser. No. 13/385,937, entitled "ROUND-TRIP ENGINEERING APPARATUS AND METHODS FOR NEURAL NETWORKS", filed Mar. 15, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to parallel networks (such as e.g., development of computerized neural networks).

2. Background

Parallel networks may be utilized in a variety of applications such as, for example, image processing, object recognition, classification, robotics, and/or other. Such networks may comprise multiple nodes (e.g., units, neurons) interconnected with one another via, e.g., synapses (doublets, connections).

Network units and/or connections may be characterized by unit/connection memory. Individual units/connections may be characterized by their respective individual (at times quite different) pieces of code (rules) that may operate on different memory elements inside neural network. In order to achieve consistent and reproducible results, individual rules should be executed in the right order. It may be desirable to operate multiple nodes of the network in parallel (contemporaneous) with one another. Multiple threads are often used in order to execute network code portions in parallel on a single and/or multiple core processing platform. In order to ensure the correct order of execution in a multithreaded network realization thread synchronization may be employed. However, thread synchronization may reduce thread execution speed particularly when multiple thread synchronization points exist.

By way of illustration, a parallel network may comprise multiple Integrate-and-Fire (IF) units/neurons characterized by update rule configured to operate on unit 'voltage'. The IF neurons may be interconnected by simple connections that may be configured to update unit voltage and connection weight w. The network may further comprise multiple neurons operable in accordance with spike-response process (SRP). The SRP neurons may be interconnected by complex synapses that may be configured to update connection weight and 'trace' variables. The trace variables may characterize various plasticity rules and mechanisms guiding behavior of both simple and complex synapse systems. IF and SRP neuron populations may be randomly connected with randomly distributed synapses of simple and complex type. Some IF neurons may be connected to simple and/or complex synapses at the same time). Pre-synaptic event rules (synapse rules configured to be executed after the spike/event generated by the pre-synaptic unit) have to be executed before unit update rules.

SUMMARY

One aspect of the disclosure relates to a method of operating a network including a plurality of nodes and a plurality of node-to-node connections by a computerized apparatus. In one or more implementations, the method includes: (i) configuring individual ones of the plurality of connections, adapted to communicate data from a source node to a target node of the plurality of nodes, to allow access to memory associated with the target node, (ii) partitioning the plurality of nodes into a first node portion and a second node portion, individual ones of the plurality of nodes characterized by node memory, (iii) selecting first portion of the plurality of connections configured to provide input to individual nodes of the first node portion, (iv) selecting second portion of the plurality of connections configured to provide input to individual nodes of the second node portion, (v) assigning the first node portion and the first portion of the plurality of connections to be operated by a first parallel executor, and (vi) assigning the second node portion and the second portion of the plurality of connections to be operated by a second parallel executor In a second aspect of the disclosure, a computerized apparatus configured to operate a parallel network is disclosed. In various implementations, the apparatus includes: (i) first and second computing elements configured operate contemporaneously with one another, the operation being characterized by a plurality of iterations, and (ii) first and second memory buffers associated with the second computing element.

In some implementations, the network includes a first partition operable via the first computing element and a second partition operable by the second computing element. For an individual iteration of the plurality of iterations: (i) operation of the first partition is based on first data stored in the first memory buffer, the first data being based on the operation of the second partition during a preceding iteration, and (ii) operation of the second partition is characterized by storage of second data in the second buffer for use during operation of the first partition during a subsequent iteration.

A third aspect of the disclosure relates to a non-transitory computer-readable storage medium having instructions embodied thereon. In some implementations, the instructions are executable by a processor to control a robotic plant. The instructions are configured to, when executed by the processor: operate a parallel network based on an input signal, the parallel network operation being characterized by a plurality of iterations, individual iterations being configured to produce a control output for the plant.

In at least one implementation, the instructions are further configured to: (i) for a given even iteration and a given odd iteration of the plurality of iterations, the given odd iteration preceding the given even iteration, store first instance of the control output in a first memory buffer for use by the plant during a subsequent odd iteration, and (ii) for the subsequent odd iteration, store third instance of the control output in the second memory buffer for use by the plant during a subsequent even iteration. The plant is configured to access second instance of the control output from a second memory buffer associated with the given odd iteration. During the given even iteration, the plant is configured to access the first instance of the control output from the first memory buffer.

In a fourth aspect of the disclosure, a parallel execution system is disclosed. In various implementations, the parallel execution system includes partitions utilizing local address of neurons thereby obviating cross-partition synchronization.

In a fifth aspect of the disclosure, a processing apparatus configured to execute at least a portion of a thread is disclosed. In one or more embodiments, the processing apparatus includes logic configured to (i) perform execution of the at least portion of the thread in parallel with at least one other processing apparatus, and (ii) access at least one memory location to allow communication of data from another thread.

In a sixth aspect of the disclosure, an apparatus configured to operate a network comprising a plurality of connections between a plurality of nodes is disclosed. In one or more embodiments, the apparatus includes a first memory and a second memory, and a non-transitory computer-readable medium configured to store at least one computer program thereon, the computer program comprising a plurality of instructions configured to, when executed, partition the plurality of nodes into at least a first node portion and a second node portion, operate a first portion of the plurality of connections and the first node portion, the operation of the first portion comprising first and second operation stages configured to be executed immediately sequentially with each other, operate a second portion of the plurality of connections and the second node portion, the operation of the second portion comprising third and fourth operation stages configured to be executed immediately sequentially with each other, and operate a combination of the first and second operation stages in parallel with a combination of the third and fourth operation stages, wherein for a given iteration of a plurality of iterations, the operation of the first node portion is based on first data configured to be stored in the first memory, the first data being based on the operation of the second node portion during a preceding iteration of the plurality of iterations, and the operation of the second node portion comprises storage of second data in the second memory, the second data being configured to be used during the operation of the first node portion during a subsequent iteration of the plurality of iterations.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
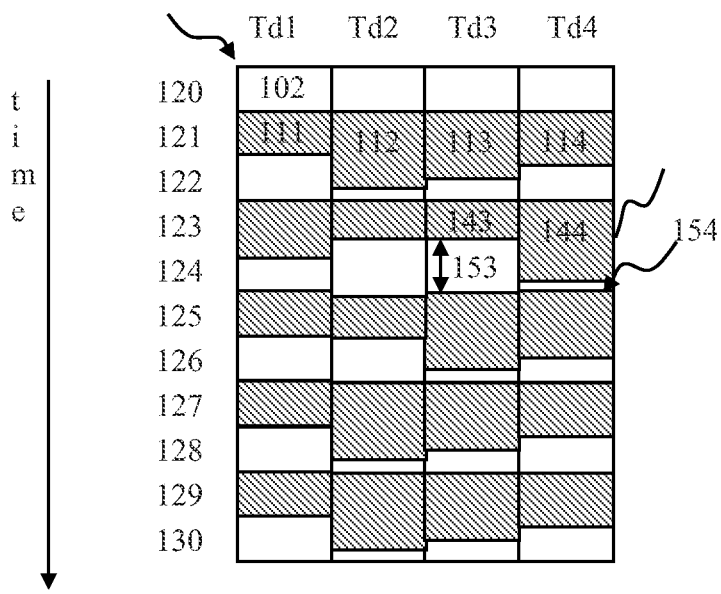
FIG. 1 is a graphical illustration depicting thread synchronization.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be electrical, optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device "may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB®, PASCAL, Python®, assembly language, markup languages (e.g., HTML, SGML, XML, VoXML), object-oriented environments (e.g., Common Object Request Broker Architecture (CORBA)), Java® (e.g., J2ME®, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the tem' "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of elements in or on to the surface of a thin substrate. By way of non-limiting example, integrated circuits may include field programmable gate arrays (e.g., FPGAs), a programmable logic device (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Multithreading Systems

In an exemplary network operable on processing hardware comprising multiple (e.g., four) processing elements such as cores, the four processing cores may execute operations provided on four threads. The network may be partitioned into four portions, with individual portions being executed using a respective thread operated by the respective processing unit. Individual portions may comprise multiple neurons and synapses. The thread execution cycle may comprise sequence illustrated in FIG. 1. The rectangle 100 illustrates operation styles of four threads (columns Td1, Td2, Td3, Td4) as a function of time (rows). Individual rows denote operational stages described below. Open rectangles (e.g., 102) denote idle thread state; hashed rectangles (e.g., 111) denote thread execution stages:

operation 120 corresponds to the hold for individual threads to be initialized;

operation 121 may denote propagation of events/spikes from the prior steps; note that execution time for individual threads may vary as depicted by varying vertical size of rectangles 111, 112, 113, 113;

operation 122 may denote thread idle stage;

operation 123 may be used to execute pre-synaptic event rules for the synapses within respective thread;

operation 124 may denote thread idle stage necessary due to potentially non-uniform execution time across threads 1-4 for operation 123;

operation 125 may denote execution of update rules for units/neurons within individual threads;

operation 126 may denote thread idle stage that may be necessary due to potentially non-uniform execution time across threads 1-4 for operation 125;

operation 127 may denote evaluation whether a given neuron has spiked, scheduling post-synaptic events responsive to spike generation by the neuron;

operation 128 may denote thread idle stage that may be necessary due to potentially non-uniform execution time across threads 1-4 for operation 127;

operation 129 may denote execution of post events within individual threads;

operation 130 may denote thread idle stage that may be necessary due to potentially non-uniform execution time across threads 1-4 for operation 129; and operations 121-130 may be subsequently repeated for a given number of network iterations.

As may be seen from the exemplary implementations illustrated in FIG. 1, there may be five hold stages (122, 124, 126, 128, and 130; also referred to as the hold states and/or synchronization points). Due to uneven thread execution duration (e.g., duration of operations 143, 144 for threads 3, 4, respectively), the hold duration may need to be configured so as to accommodate the longest operation execution time (e.g., 144). In this manner, one thread may be idle for a period (e.g., 153) that may be considerably longer than idle time of another thread (e.g., 154). The presence of multiple hold states per thread execution cycle may reduce network execution speed.

Multithreaded Parallel Network

Figure 2:
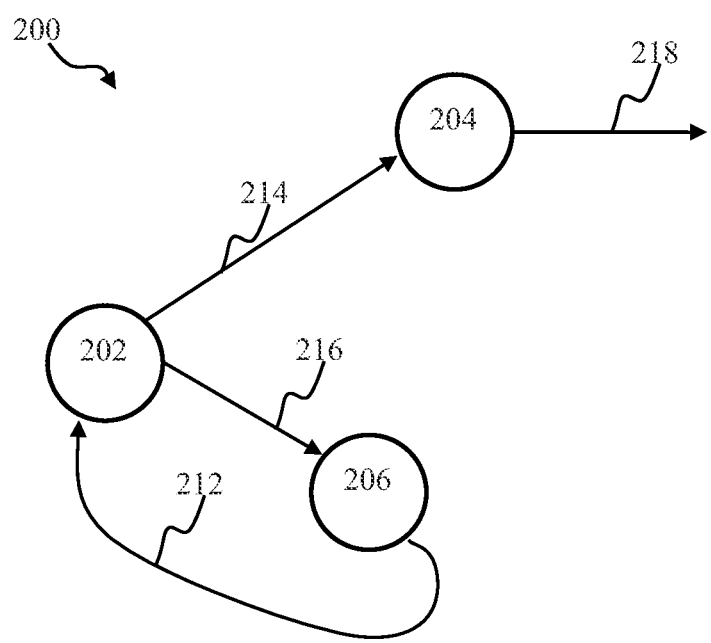
FIG. 2 is a block diagram depicting spiking neuron network for use with the multithread network execution methodology of the disclosure, in accordance with one or more implementations.

Multithreaded parallel network operation methodology of the disclosure is described in detail. FIG. 2 illustrates one realization of a spiking neuron network 200. Such parallel networks, may comprise multiple interconnected neurons (such the neuron 340 described with respect to FIG. 3 below), may be utilized for, for example, implementing an adaptive controller configured to control a robotic device, e.g., controller 902 of FIG. 9, described below). Although three neurons 202, 204, 206 are shown in FIG. 2 for clarity, the network 200 may comprise thousands to many millions of neurons with thousands to many millions of connections. By way of illustration, a network, developed by the Assignee thereof, comprising 30,000 neurons, 30,000,000 synapses, may require about 37 milliseconds to execute an update for an average spike rate of 1 Hz on an 8-core Intel® Xeon® processor operable at 2.3 GHz utilizing single thread.

Returning now to the exemplary network 200 of FIG. 2, then neuron 202 may provide output to the neurons 204, 206 via connections/synapses 214, 212, respectively. The neuron 206 may provide output to the neuron 202 via connection 216; neuron 204 may provide output to other neurons and/or entity (e.g., motor actuator, and/or buffer). The neuron 202 may receive input (not shown) from another neuron and/or network entity. In some implementations, the input may comprise sensory input (e.g., digitized image frame) as described with respect to FIG. 10B, below. In one or more implementations, the network elements 202, 204, 206 may denote portions of the network comprising multiple neurons, such the neuron 340 described with respect to FIG. 3 below.

Figure 3:
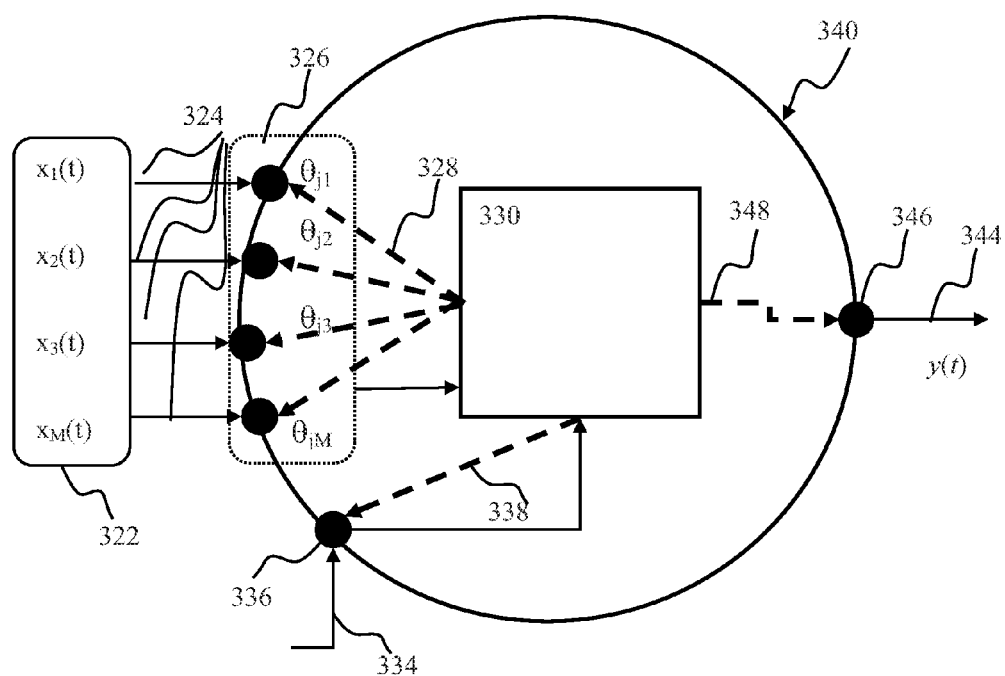
FIG. 3 is a block diagram illustrating spiking neuron for use with the network of FIG. 2, in accordance with one or more implementations.

The spiking neuron 340 of FIG. 3 may be operable according to, for example, a Spike Response Process (SRP) denoted by block 330 in FIG. 3. The neuron 340 may receive M-dimensional input stream X(t) 322 via connections 324. In some implementations, the M-dimensional stream may correspond to M-input synaptic connections 324 into the neuron 340. As shown in FIG. 3, individual input connections 324 may be characterized by a connection parameter 326 $\theta_{ij}$. The parameter hat $\theta$ may be referred to as the learning parameter and configured to be adjusted during learning. In one or more implementations, the learning parameter may comprise connection efficacy (e.g., weight). In some implementations, the learning parameter may comprise transmission (e.g., synaptic) delay. In some implementations, the parameter 326 may comprise probability of spike transmission via the respective connection.

In some implementations, the neuron 340 may be configured to receive external input via the connection 334. In one or more implementations, the input 334 may comprise training input. In some implementations of supervised learning, the training input 334 may comprise a supervisory spike that may be used to trigger neuron post-synaptic response.

The neuron 340 may be configured to generate output y(t) (e.g., a post-synaptic spike) that may be delivered to the desired targets (e.g., other neurons of the network, not shown) via one or more output connections (e.g., 344 in FIG. 3). As shown in FIG. 3, individual output connections 344 may be characterized by a connection parameter 346 that may be adjusted during learning. In one or more implementation, the connection parameter 346 may comprise connection efficacy (e.g., weight). In some implementations, the parameter 346 may comprise synaptic delay. In some implementations, the parameter 346 may comprise spike transmission probability.

The neuron 340 may be configured to implement controller functionality, such as for example that described in co-owned and co-pending U.S. patent application Ser. No. 13/487,533, entitled "SYSTEMS AND APPARATUSES FOR IMPLEMENTING TASK-SPECIFIC LEARNING USING SPIKING NEURONS", filed Jun. 4, 2012, incorporated supra, in order to control, for example, a robotic arm. The output signal y(t) may include motor control commands configured to move a robotic arm along a target trajectory. The process 330 may be characterized by internal state q. The internal state q may, for example, comprise a membrane voltage of the neuron, conductance of the membrane, and/or other parameters. The process 330 may be characterized by one or more learning parameter which may comprise input connection efficacy, 326, output connection efficacy 346, training input connection efficacy 336, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 334 in FIG. 3) may be differentiated from sensory inputs (e.g., provided via the connections 324) to the neuron 340 as follows. During learning: data (e.g., spike events) arriving to the neuron 340 via the connections 324 may cause changes in the neuron state (e.g., increase neuron membrane potential and/or other parameters). Changes in the neuron state may cause the neuron to generate a response (e.g., output a spike). Teaching data arriving to the neuron 340 via the connection 334 may cause (i) changes in the neuron dynamic model (e.g., modify parameters a,b,c,d of Izhikevich neuron model, such as for example that described in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to the neuron 340 via the connections 324 may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

Connections 324 in FIG. 3 may communicate one or more spiking and/or analog inputs. As used herein the term 'spiking' signal may be used to describe signals comprising one or more discrete events. In some implementations, a spiking signal may comprise a stream of bits where value of '1' may be used to indicate individual events. In some implementations, spiking signal may comprise one or more messages (having for example a time stamp associated therewith) corresponding to individual events.

As used herein the term 'non-spiking' and/or 'analog' signal may be used to describe real world continuous signals. In some implementations, the non-spiking signal may comprise an analog signal (e.g., a voltage and/or a current produced by a source). In one or more implementations, the non-spiking signal may comprise a digitized signal (e.g., sampled at regular intervals (sampling rate) with a given resolution). In some implementations, the continuous signal may include one or more of an analog signal, a polyadic signal with arity greater than 2, an n-bit long discrete signal with n-bits greater than 2, a real-valued signal, and/or other continuous signal.

In one or more implementations, such as object recognition, and/or obstacle avoidance, the input 322 may comprise a stream of pixel values associated with one or more digital images (e.g., video, radar, sonography, x-ray, magnetic resonance imaging, and/or other types). Pixel data may include data conveying information associated with one or more of RGB, CMYK, HSV, HSL, grayscale, and/or other information. Pixels and/or groups of pixels associated with objects and/or features in the input frames may be encoded using, for example, latency encoding such as that described in co-owned U.S. patent application Ser. No. 12/869,583, filed Aug. 26, 2010 and entitled "INVARIANT PULSE LATENCY CODING SYSTEMS AND METHODS", now patented as U.S. Pat. No. 8,467,623 on Jun. 18, 2013; co-owned U.S. Pat. No. 8,315,305, issued Nov. 20, 2012, entitled "SYSTEMS AND METHODS FOR INVARIANT PULSE LATENCY CODING"; co-owned and co-pending U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described co-owned U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METH- ODS", now patented as U.S. Pat. No. 9,070,039 on Jun. 30, 2015, each of the foregoing being incorporated herein by reference in its entirety.

In one or more implementations, object recognition and/or classification may be implemented using for example a spiking neuron classifier comprising conditionally independent subsets, such as those described in co-owned and co-pending U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS", and/or co-owned and co pending U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such as for example the neuron excitability described in co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012, now patented as U.S. Pat. No. 9,047,568 on Jun. 2, 2015, the foregoing being incorporated herein by reference in its entirety.

In some implementations, analog inputs may be converted into spikes using, for example, kernel expansion techniques such as those described in co-owned and co-pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as for example those described in co-owned U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-owned and co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

The learning parameters associated with the input/output connections (e.g., the parameters 326, 336, 346) may be adjusted in accordance with one or more rules, denoted in FIG. 3 by broken arrows 328, 338, 348, respectively.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012 and now patented as U.S. Pat. No. 9,098,811 on Aug. 4, 2015; conditional plasticity rules described in co-owned U.S. patent application Ser. No. 13/541,531, entitled "CONDITIONAL PLASTICITY SPIKING NEURON NETWORK APPARATUS AND METHODS", filed Jul. 3, 2012, now patented as U.S. Pat. No. 9,111,215 on Aug. 18, 2015; plasticity configured to stabilize neuron response rate as described in co-owned and co-pending U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, now patented as U.S. Pat. No. 8,972,315 on Mar. 3, 2015, co-owned U.S. patent application Ser. No. 13/660,945, entitled "MODULATED PLASTICITY APPARATUS AND METHODS FOR SPIKING NEURON NETWORKS", filed Oct. 25, 2012 and now patented as U.S. Pat. No. 9,111,226 on Aug. 18, 2015; and co-owned and co-pending U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in co-pending U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in co-owned and co-pending U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety.

Connection efficacy updated may be effectuated using a variety of applicable methodologies such as, for example, event based updates described in detail in co-pending U.S. patent application Ser. No. 13/239,255, filed Sep. 21, 2011, entitled "APPARATUS AND METHODS FOR SYNAPTIC UPDATE IN A PULSE-CODED NETWORK"; co-pending U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and co-pending U.S. patent application Ser. No. 13/560,891 entitled "APPARATUS AND METHODS FOR EFFICIENT UPDATES IN SPIKING NEURON NETWORK", each of the foregoing being incorporated herein by reference in its entirety.

Neuron process 330 may comprise one or more learning rules configured to adjust neuron state and/or generate neuron output in accordance with neuron inputs (e.g., 322, 324 in FIG. 3).

In some implementations, the one or more leaning rules may comprise state dependent learning rules described, for example, in co-owned and co-pending U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012 and/or co-owned U.S. patent application Ser. No. 13/722,769 filed Dec. 20, 2012, and entitled "APPARATUS AND METHODS FOR STATE-DEPENDENT LEARNING IN SPIKING NEURON NETWORKS", now patented as U.S. Pat. No. 8,990,133 on Mar. 24, 2015, each of the foregoing being incorporated herein by reference in its entirety.

In one or more implementations, the one or more leaning rules may be configured to comprise one or more reinforcement learning, unsupervised learning, and/or supervised learning as described in co-owned and U.S. patent application Ser. No. 13/487,499, filed Jun. 4, 2012, entitled "STOCHAS- TIC APPARATUS AND METHODS FOR IMPLEMENTING GENERALIZED LEARNING RULES, now patented as U.S. Pat. No. 9,104,186 on Aug. 11, 2015, incorporated supra.

In one or more implementations, the one or more leaning rules may be configured in accordance with focused exploration rules such as described, for example, in co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, now patented as U.S. Pat. No. 8,943,008 on Jan. 27, 2015, the foregoing being incorporated herein by reference in its entirety.

It may be desirable to reduce network processing time by operating individual neurons (or network portions) e.g., 202, 204, 206 in parallel (e.g., contemporaneous) with one another. In some implementations, such as described with respect to FIGS. 4A-4C, 6, below, individual network portions may be executed using respective thread of multiple threads executed in parallel.

Figure 6:
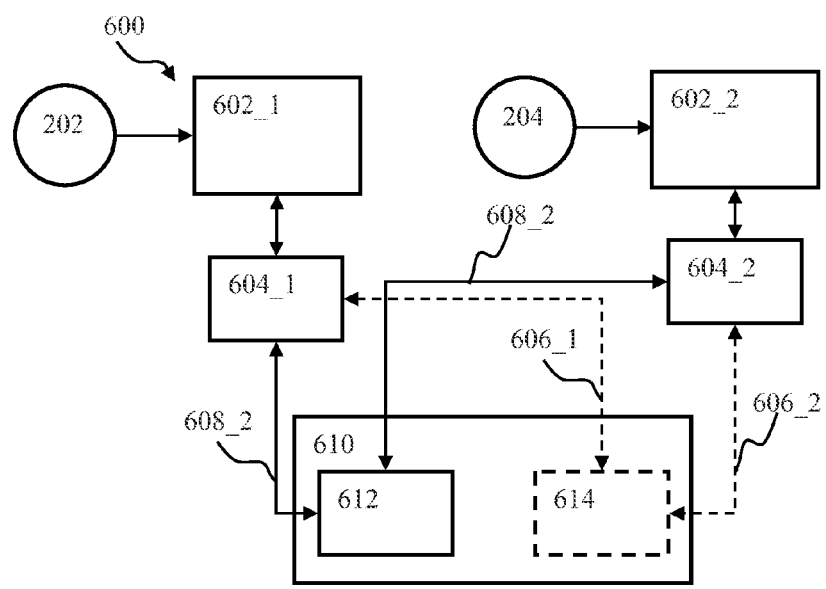
FIG. 6 is a block diagram illustrating a parallel computerized processing apparatus comprising shared neuron memory and shared synaptic memory, in accordance with one or more implementations.

FIG. 6 illustrates operation of two portions of a network (e.g., the portions 202, 204 200 of the network 200 in FIG. 2) using a processing platform 600 comprising two processing elements 602. In some implementations, the processing elements 602 may comprise physical or virtual processing cores of a processing device, individual physical processors of a computing device, individual computers of a computing cluster, an/or individual services of a cloud service. In one or more implementations, the processing apparatus 600 may comprise one or more of a multi-core general purpose processor (e.g., Intel® Core i7®, Xeon®, DSP), a multi-core specialized processor (e.g., a graphics processing unit (GPU), a multi-core DSP, a multi-core neuromorphic processing unit (NPU)), FPGA, a processing core (e.g., RISC/CISC), an ASIC, a neuromorphic processor (e.g., processing apparatus 1145, 1150 of FIGS. 11B-11C), a computing cluster, and/or Cloud computing services, Individual processing elements 602 may be afforded dedicated memory 604. In some implementations, the dedicated memory may comprise processor dedicated cache, dedicated processor core cache, memory of an individual computer in a computing cluster, memory dedicated exclusively to a cloud computing process, and/or another realization. The processing elements 602_1, 602_2 may exchange data (e.g., read/write) with the dedicated memory 604_1, 604_2, respectively.

The processing apparatus 600 may comprise shared memory 610. In one or more implementations, the dedicated memory may comprise processor shared cache, cache shared between two or more processor cores, random access memory (RAM) of a computer that may be shared between two or more processor and/or processor cores; shared memory within a computer cluster, memory shared between two or more computing processes within a cloud, and/or another realization. Dedicated and/or shared memory may comprise one or more of charge-based memory, e.g., static RAM (SRAM), dynamic RAM (DRAM), mobile DRAM, low-power DRAM, flash memory; magnetic storage (e.g., hard drive), optical memory. It will be appreciated by those skilled in the arts that other another memory technologies (e.g., phase-change memory (PCM), memristors (RRAM), and/or spin-torque transfer magneto resistive RAM (STT-MRAM) may be utilized.

The shared memory 610 may be configured to store neuron data 612 and synapse data 614. In one or more implementations the neuron data 612 may comprise parameters of neuron process for a given neuron type e.g., a,b,c,d,u,v of Izhikevich neuron process, parameters of individual network neurons (e.g., 340 in FIG. 3), such as membrane potential, firing threshold, time of one or more spikes that may have been generated by the neuron, and/or other parameters (e.g., a mean firing rate). In some implementations the synapse data may comprise parameters of synapse process (e.g., STDP curve) for a given synapse type, parameters of individual network synapses (e.g., 324 in FIG. 3), such as weights, eligibility traces, counters, and presynaptic times). In various implementations, constant parameters may be embedded in the execution code. Further, whether constant or adaptive parameters may apply more or less broadly depending on one or more storage assignments. For example, certain parameters may be assigned to a unit class and stored as such. In some cases, parameters my apply to specific unit instances and may be store accordingly.

Individual processing elements 602_1, 602_2 may be configured to execute a given neuron (or a network portion), e.g., 202, 204 in FIG. 2. In some implementations, execution of individual network portions may be effectuated using respective threads, as described with respect to FIG. 4A, below. Individual threads may be executed by a respective processing element (e.g., 602). As shown in FIG. 3 by arrows 606_1, 606_2, 608_1, 608_2, neuron and/or synapse data for the respective network portion may be communicated from shared network memory to the dedicated memory of the respective core. It may be of benefit to minimize the amount of information sent between processing elements, as the cross-thread memory traffic may leads to memory synchronization overheads and/or reduce network execution speed.

In one or more implementations configured to reduce cross-thread traffic and/or reduce number of synchronization locks, network may be partitioned such that for a given network portion, the neurons and the input synapses into neurons within the portion are executed within the same thread. Synapse update rules may be configured such that to (i) allow access to memory of a post-synaptic neurons (e.g., the neuron 206 for the synapse 216 in FIG. 2); (ii) forbid memory access to pre-synaptic neurons (e.g., the neuron 202 for the synapse 216 in FIG. 2). In some implementations, the synapses may be forbidden direct access pre-synaptic neurons.

Figure 4A:
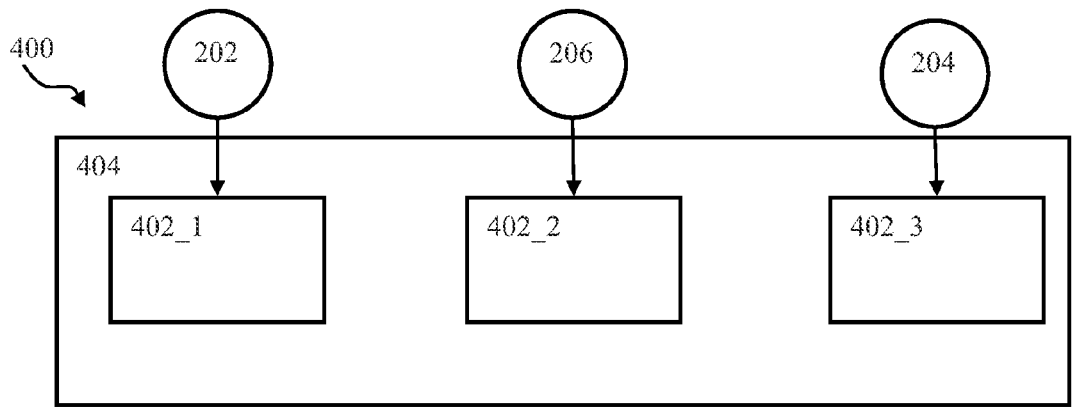
FIG. 4A is a block diagram illustrating use of multithreaded execution in a parallel network, in accordance with one or more implementations.

By way of a non-limiting illustration shown in FIG. 4A, the network 200 of FIG. 2, may be partitioned such that the thread 402_1 may execute operations of the neuron 202 and the synapse 212; thread 402_2 may execute operations of the neuron 204 and the synapse 214; and thread 402_3 may execute operations of the neuron 206 and the synapse 216. Processing apparatus 404 may execute threads 402 in parallel (e.g., contemporaneous with one another). In some implementations, the apparatus 404 may comprise computerized apparatus (e.g., the apparatus 600 of FIG. 6) comprising one or more processing elements (e.g., 602 in FIG. 6). It should be noted that in some implementations, that number of threads may match or not match the number of processing elements within processing apparatus 404. For example, a number of threads less or equal to the number of processing elements may be used.

Figure 5A:
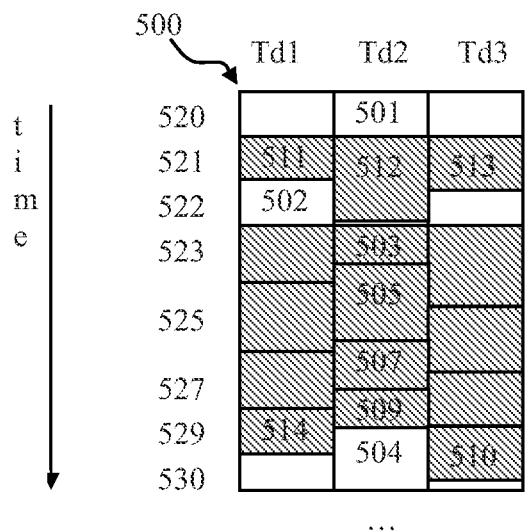
FIG. 5A is a graphical illustration depicting thread utilization corresponding to the multithreaded execution configuration of FIG. 4A, in accordance with one or more implementations.

FIG. 5A illustrates one exemplary implementation of parallel network operation by the processing apparatus 400 of FIG. 4A. The table 500 illustrates operational stages of three threads (columns Td1, Td2, Td3) as a function of time (rows). Individual rows denote operational stages described below. Open rectangles (e.g., 502, 504) denote idle thread stage; hashed rectangles (e.g., 511) denote thread execution stages.

The network associated with the timing diagram of FIG. 5A may be partitioned such that for a given network portion the neurons and the input synapses into the neurons within the portion are operated by the same thread. By way of illustration of network 200 operation:

the neuron 202 and the synapse 212 may be operated by thread 1 Td1 in FIG. 5A;
the neuron 204 and the synapse 214 may be operated by thread 2 Td2 in FIG. 5A; and
the neuron 206 and the synapse 216 may be operated by thread 3 Td3 in FIG. 5A.

Synapse update rules may be configured such that to (i) allow access to memory of a post-synaptic neurons; forbid memory access to pre-synaptic neurons.

Partitioned network operation may be described as follows. Operations at row 520 denote hold stage (e.g., 501) while individual threads are being initialized. In some implementations, these operations may include the operating system allocating resources to a particular thread, threads being assigned identifiers (e.g. handles), threads being added to a execution schedule, and/or threads being bound to particular processing elements. Further, during this hold stage, thread-specific data structures may be instantiated and weights may be assigned.

Operations at row 521 may correspond to execution of code associated with one or more prior network events. In some implementations, the prior events may correspond to spike generation events by one or more neurons of one or more network partitions. Operations 511, 512, 513 at row 521 for a given partition (e.g., operations 511 of thread Th1 in FIG. 5A) may comprise determination whether spikes have been generated during a preceding iteration by one or more neurons within the thread (e.g., Th1) and/or by neurons of other threads that may provide input to the neurons of the (e.g., the neuron 204 of FIG. 2 operable by Th2 in FIG. 5A). This functionality may be collectively referred to as "event collection".

Connectivity of a network (e.g., 200) operable by threads Th1, Th2, Th3 of FIG. 5A may be expressed as follows:

TABLE 1

| Thread 1 | Thread 2 | Thread 3 |
|---|---|---|
| n1: 202 | n1: 204 | n1: 206 |
| [2:1] | [1:1] | [ ] |
| [3:1] | | |

In Table 1, target neuron IDs may be stored in an array and/or table in the following format: [thread_id: local_id], e.g., neuron 1 of Thread 1 is connected to (i) neuron 1 of thread 2, [2:1] and (ii) neuron 1 of Thread 3, [3:1])

For a given thread (e.g., 402_1 in FIG. 4A), event collection may comprise: determining IDs of neurons within the thread that have spiked at the preceding iteration (e.g., for a given neuron that had spiked. For the neuron that had spiked, (e.g., the neuron n1 of Thread 1 in Table 1), determination may be made of neuron IDs that may be receiving spikes from the spiked neuron (e.g., neurons n1 of Thread 2, neuron n1 of Thread 3 in Table 1). Based on activity determination, evaluation of pre-synaptic event rule for the synapses within given thread may be scheduled for execution by operation at row 523.

Neuron activity during prior iteration may be determined using the target IDs using distributed connectivity architecture, described with respect to FIGS. 7A-7B, below. In some realizations, neuron activity information associated with prior iteration may be determined using a buffer queues associated with a given thread (e.g., buffers 416 in FIG. 4B, described below). By way of illustration, thread 1 (412_1 in FIG. 4B may access buffer 416_2 in order to determine as to whether rules for synapses (e.g., 212 in FIG. 2) operable by the thread 1 may need to be evaluated; threads 2,3 (412_2, 412_3 in FIG. 4B) may access buffer 416_1 in order to determine as to whether rules for synapses (e.g., 214, 216 in FIG. 2) operable by the threads 2,3, respectively, may need to be evaluated.

Pseudo-code describing event collection by thread thread_id may be expressed as:

1. for thread current_th of all_threads:
2. access queue of thread_id from the queues of current_th (e.g., individual columns of Table 1)
3. from thread_id queue obtain local_neuron_IDs (e.g., individual cells within a column of Table 1)
4. for individual 'local_neuron_ID'
5. determine synapse_ID for synapses associated with the local_neuron_ID; (e.g., entries below the neuron ID in square brackets [ ] in Table 1)
6. if neuron 'local_neuron_id' had spiked, add this synapse_ID to list of synapses for which call of pre-event is to be executed Listing 1

It is noteworthy that event collection execution time for individual threads may vary as depicted by varying vertical size of rectangles 511, 512, 513. Upon completion of the event collection operations (e.g., 511 in FIG. 5A) given thread may proceed with executing subsequent operations that may cause corruption of spike event queue (e.g., data in buffers 416 in FIG. 4B) due to, for example, another spike being generated by neuron(s) of the thread. It may be desirable to ensure that data in the buffers 416 from the preceding iteration are not overwritten during operation of the current iteration. Operations at row 522 (e.g., 502) may be held until execution of the operations 511, 512, 513 is completed. The hold on operations at row 522 may be referred to as the "event propagation hold" in one or more realizations. Duration of the event propagation hold at row 522 may be configured to ensure that the longest running thread operation from row 521 (e.g., the operation 512 for Thread 2) is completed. In some implementations, this event propagation hold may be effectuated using an operating system call in which the system scheduler is instructed not to schedule execution of the operations at row 522 until some condition is met. For example, this condition may include a completion flag bit that is toggled, a neuron reaching a predetermined state, or some other indicator. In various implementations, a spinlock may be used to effect the hold. For example, multiple threads may share a common counter which is synchronized between then (protected memory accessible across threads). As operations complete the threads may increment the counter. When the counter reaches a predetermined value certain threads undergoing holds (or execution delay loops) may exit the hold/loop and begin execution. In some implementations of spiking neuron processes (e.g., IF, SRP, and/or other) operations of row 523 (e.g., pre-synaptic rule evaluation) for a given neuron may be configured based on neuron current state; the neuron state may be modified during operations at row 521 that may be configured to store updated neuron state(s) into neuron memory storage (e.g., 612 in FIG. 6). Utilizing thread stages 522 may aid to ensure that all neuron states are up-to-date (e.g., all of the write operations at row 521 are completed). In some implementations, the interval between successive steps may depend on processor and operating system timing/performance.

In some implementations, pairs of even/odd iteration data buffers, e.g., 416, 417 described in detail with respect to FIGS. 4B, 5B below so that for a given spiked neuron local_id information may be retrieved using odd/even buffers of thread thread_id so that propagation block operations at row 522 may be eliminated. In some implementations, such as illustrated in FIG. 7A-7B, distributed connectivity approach may employ partitioned of event queues (e.g., buffer pairs 716, 717 in FIGS. 7A-7B).

Operations at row 523 may be used to evaluate pre-synaptic event rule for the synapses within respective thread. In one or more implementations, pre-synaptic event rule evaluation may comprise, for example, executing STDP events, updating weights or eligibility traces, and/or incrementing the voltage of post-synaptic neurons.

Operations at row 525 may denote execution of update rules for units/neurons within individual threads. In some implementations, the update rule evaluation may comprise update of an IF neuron membrane voltage and/or parameters of a SRP neuron subsequent to execution of pre-events for that neuron. Partitioning the network in accordance with the methodologies described herein may enable asynchronous execution of operations at rows 523, 525 (e.g., as illustrated by back-to-front scheduling of operations 503, 507 for thread Td2 in FIG. 5A) as the synapses pertained to a given neuron and the neuron are operated within the same thread thereby alleviating the need for the cross-thread synchronization of the prior art (e.g., operation 124 in FIG. 1) may be removed.

Operations 527 may denote an evaluation whether (i) a given neuron has responded (e.g., generated a spike); and/or (ii) scheduling of one or more post-synaptic events based on the response generation by the neuron. Partitioning the network in accordance with the methodologies described herein may enable asynchronous execution of operations at rows 525, 527 (e.g., as illustrated by back-to-front scheduling of operations 505, 507 for thread Td2 in FIG. 5A) as the synapses pertained to a given neuron and the neuron are operated within the same thread thereby alleviating the need for the cross-thread synchronization of the prior art (e.g., operation 126 in FIG. 1) may be removed.

Operations at row 529 may denote execution of post-synaptic updates within individual threads. These operations may include executing STDP plasticity operations, updating eligibility traces, updating counters, and/or other post-synaptic update operations. Partitioning the network in accordance with the methodologies described herein may enable asynchronous execution of operations at rows 527, 529 (e.g., as illustrated by back-to-front scheduling of operations 507, 509 for thread Td2 in FIG. 5A) as the synapses pertained to a given neuron and the neuron are operated within the same thread thereby alleviating the need for the cross-thread synchronization of the prior art (e.g., operation 128 in FIG. 1) may be removed.

Operations at row 530 (e.g., 504) may be held to allow completion of operation execution at row 529. The hold on operations at row 530 may be referred to as the "output hold" in one or more realizations. The output hold duration may be configured to ensure that the greatest running thread operation duration from row 529 (e.g., the operation 510 for Thread 3 in the implementation of FIG. 5A) is completed. In some implementations, this event propagation hold may be effectuated using an operating system call in which the system scheduler is instructed not to schedule execution of the operations at row 530 until some condition is met. For example, this condition may include a completion flag bit that is toggled, a neuron reaching a predetermined state, or some other indicator. In various implementations, a spinlock may be used to effect the hold. For example, multiple threads may share a common counter which is synchronized between then (protected memory accessible across threads). As operations complete the threads may increment the counter. When the counter reaches a predetermined value certain threads undergoing holds (or execution delay loops) may exit the hold/loop and begin execution. Thread idling during the output hold may be used to enable simultaneous 'poll' I/O data output by individual threads Td1, Td2, Td3 in FIG. 5A. In some implementations, the asynchronous polling I/O data may comprise one or more of (i) another entity (e.g., motor controller of a robotic plant such as the plant 910 in FIG. 9) accessing (e.g., polling) the network output data buffer to obtain a motor command; retrieving spikes from neurons for analysis; and/or retrieving voltages and weights for analysis. In one or more implementations of asynchronous pooling, it may be beneficial to obtain output from two or more thread operations at row 529 (e.g., 509, 510, and/or 514) in order, e.g., to appropriately configure the motor command. In some implementations, this may allow for the recordation of the true neuron states at this step. This may provide for subsequent analysis of the dynamics of the network. In one such realization, a motor controller may be configured to receive the output of two or more neurons (e.g., 1052 in FIG. 10B) that may be operable by two or more threads. The output of the neurons 1052_1, 1052_m may correspond to, e.g., motor commands to right and left motors, respectively. In order to perform the correct maneuver (e.g., proceed straight) a hold state (e.g., 530 in FIG. 5A) may be implemented so as to ensure that the motor control commands for individual motors match with one another (e.g., correspond to the same network iteration). Thread iteration match may be based on a distributed thread iteration counter. In one or more implementations, individual threads (e.g., 412_1, 412_2, 412_3) may be configured to initialize, increment, and/or decrement a network iteration counter. Thread synchronization operations may be performed at, e.g., thread initialization stage of the row 520 of FIG. 5A, wherein iteration counters of two one more threads may be compared with one another. Thread iteration synchronization may be employed in order to ensure that the data (e.g., spikes) of the neuron population of thread 412_1 are provided at an appropriate iteration (e.g., within the same and/or subsequent iteration) to neuron population of thread 412_2 and/or 412_3 in the implementation of FIG. 4B.

Operations at rows 521-530, that collectively may be referred to as the network operation cycle and/or a network iteration) may be subsequently repeated for a given number of iterations. Comparing thread execution timing of FIG. 1 and FIG. 5A it may be determined that four hold stages per iteration (e.g., idle states between stages 521-523, 523-525, 525-527, 527-529 in FIG. 5A) may be omitted.

Removal of idle stages may decrease the overall duration of the network iteration. Such reduction of iteration execution time may be traded for (i) an increased throughput of a neuromorphic processing apparatus (e.g., enabling the apparatus 404 of FIG. 4A to process a greater number of network iteration in a given time interval; and/or (ii) neuromorphic processing apparatus of reduced complexity (due to e.g., a lower clock rate, fewer cores), size (e.g., smaller cooling hardware and/or lower number of cores), and/or cost. In an exemplary implementation, a two-fold performance was achieved. In this implementation, average execution time dropped to 18 ms compared to 35 ms without this removal of idle states.

Figure 4B:
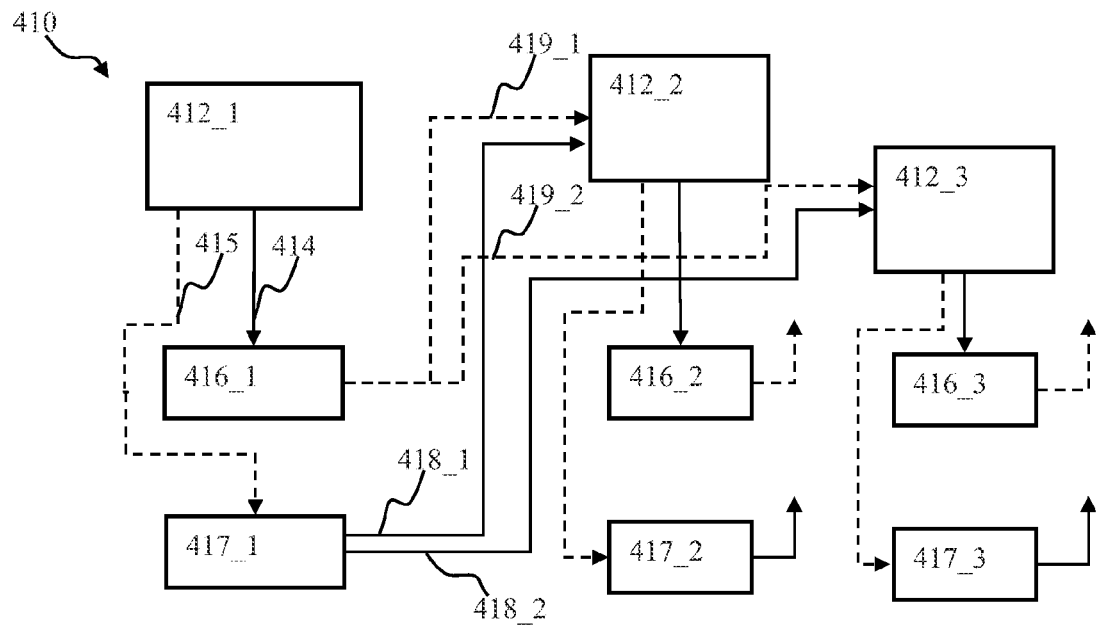
FIG. 4B is a block diagram illustrating use of read and write buffers for multithreaded execution of a parallel network, in accordance with one or more implementations.

FIG. 4B illustrates a processing apparatus 410 configured to implement optimized operation of parallel network (e.g., the network 200 in FIG. 2) without the use of the event propagation hold stage (e.g., operations at row 522 in FIG. 5A). In some implementations, the apparatus 410 may comprise a computerized apparatus (e.g., the apparatus 600 of FIG. 6) comprising one or more parallel processing elements (e.g., 602 in FIG. 6). It should be noted that in some implementations, that number of threads may match or not match the number of processing elements within computerized apparatus 600. For example, a number of threads less or equal to the number of processing elements may be used.

Blocks 412 in FIG. 4B denote individual threads that may be executed by multiple cores contemporaneous with one another. In some implementations of for example an Intel CPU, a given thread (e.g., 412_2) may be operated by a dedicated CPU core. In one or more implementations of, for example, a GPU, a given thread may be operated by multiple cores.

Individual thread (e.g., 412_1, 412_2, 412_3) may be afforded an odd read/write buffer (e.g., 416_1, 416_2, 416_3) and an even read/write buffer (e.g., 417_1, 417_2, 417_3). In some implementations of spiking neuron processes (e.g., IF, SRP, and/or other), the buffers 416, 417 may be utilized to store identifiers of spiking neurons, and/or the payload of those spikes.

The network, operable by the apparatus 410, may be partitioned such that for a given network portion, the neurons and the input synapses into neurons within the portion are executed within the same thread. Synapse update rules may be configured such that (i) they may allow access to memory of a post-synaptic neurons (e.g., the neuron 206 for the synapse 216 in FIG. 2); and/or they may forbid memory access to pre-synaptic neurons (e.g., the neuron 202 for the synapse 216 in FIG. 2). By way of a non-limiting illustration shown in FIG. 4B, the network 200 of FIG. 2, may be partitioned such that thread 412_1 may execute operations of the neuron 202 and the synapse 212; thread 412_2 may execute operations of the neuron 204 and the synapse 214; and thread 412_3 may execute operations of the neuron 206 and the synapse 216.

Figure 5B:
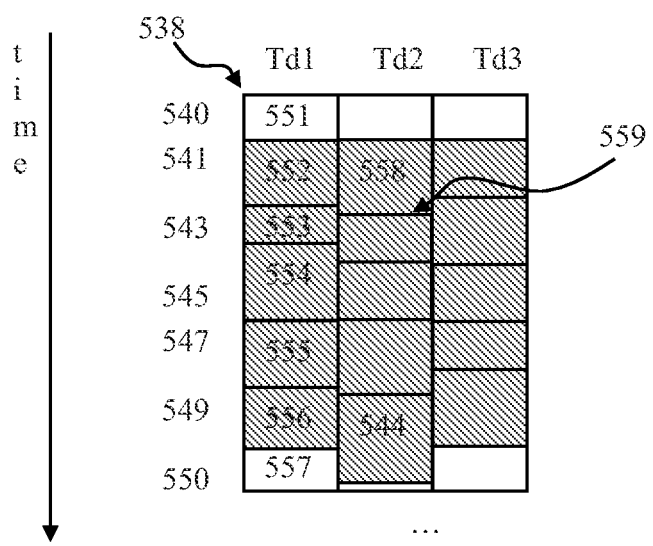
FIG. 5B is a graphical illustration depicting thread utilization corresponding to the multithreaded execution of FIG. 4B, in accordance with one or more implementations.

FIG. 5B illustrates one exemplary implementation of operation of partitioned parallel network by the processing apparatus 410 of FIG. 4B. The table 538 illustrates operational stages of three threads (columns Td1, Td2, Td3) as a function of time (rows). Individual rows denote operational stages described below. Open rectangles (e.g., 557) denote idle thread stages; hashed rectangles (e.g., 552) denote thread execution stages.

Operations at row 540 denote a hold stage (e.g., 551) while individual threads are being initialized. In some implementations, these operations may include the operating system allocating resources to a particular thread, threads being assigned identifiers (e.g. handles), threads being added to a execution schedule, threads being bound to particular processing elements, and/or initialization of odd/even buffer data structures. Further, during this hold (e.g., 551) stage, thread-specific data structures may be instantiated and weights may be assigned.

Operations at row 541 may correspond to execution of code associated with one or more prior network events. In some implementations, the prior events may correspond to spike generation events by one or more neurons of the partition. Operations at row 541 may comprise spike delivery and/or collect all pre-synaptic events to execute for an associated network partition. It is noteworthy that execution time for individual threads may vary as depicted by varying vertical size of rectangles (e.g., 552, 558).

Operations at row 543 may be used to evaluate pre-synaptic event rule for the synapses within respective thread. In one or more implementations, pre-synaptic event rule evaluation may comprise may comprise, for example, executing STDP events, updating weights or eligibility traces, and/or incrementing the voltage of post-synaptic neurons. Comparing tables 500 and 538 in FIGS. 5A, 5B, respectively, it may be discerned that the event propagation hold (e.g., the operations of row 522 in FIG. 5A) is absent in the implementation described with respect to FIG. 5B.

Returning now to FIG. 4B, operation of the computerized apparatus 410 that may alleviate the use of the event propagation stage for the implementation shown in FIG. 5B is now described in detail. Data traffic associated with even network iterations is denoted by solid arrows; data traffic associated with even network iterations is denoted by broken line arrows in FIG. 4B. Only the traffic for thread 412_1 is detailed with a portion of the thread 412_2, 412_3 omitted in FIG. 4B for clarity.

By way of illustration, for an odd network iteration (e.g., iteration 3), upon completing operations of row 541 (e.g., 552 for thread 412_1) network data (e.g. neuron identifiers for spiking neurons and/or associated spike payloads, voltages, spikes, and weights for the odd/even buffers) generated by the operation 552 may be stored in the odd buffer 416_1 of thread 1, as shown by the arrow 414 in FIG. 4B. It is noteworthy that the even iteration buffer 417_1 may maintain uncorrupted copy of the thread 1 network data from a prior iteration (e.g., iteration 2). As shown in FIG. 5B, duration of operations by individual threads Th1, Th2, Th3 for a given row (e.g., 541) may vary from one another. By way of example, thread Th2 may complete at time t1 spike propagation operation 552 prior to the tread Th2 completing the respective operation 558. Accordingly, the data buffer 416_1 may contain an updated copy of the network data that may be used by a subsequent iteration (e.g., iteration 4). At time t2>t1, the thread Th2 may request network data corresponding to neurons of the network portion being operated by thread, as depicted by arrow 559 in FIG. 5B. Based on one or more such requests at iteration 3 by, e.g., threads 412_2, 412_3, for the network data associated with the neurons (e.g., 202 in FIG. 2) being processed by thread 412_1, the data may be provided to threads 412_2, 412_3 from the even iteration buffer 417_1, as shown by the arrows 418_1, 418_2, respectively, in FIG. 4B.

For an even network iteration (e.g., iteration 4), upon completing operations of row 541 (e.g., 552 for thread 412_1) network data generated by the operation 552 may be stored in the even buffer 417_1 of thread 1, as shown by the broken line arrow 414 in FIG. 4B. It is noteworthy that the odd iteration buffer 416_1 may maintain uncorrupted copy of the thread 412_1 network data from the preceding iteration (e.g., iteration 3). Based on one or more requests at iteration 4 by, e.g., threads 412_2, 412_3, for the network data associated with the neurons (e.g., 202 in FIG. 2) being processed by thread 412_1, the data may be provided to threads 412_2, 412_3 from the odd iteration buffer 416_1, as shown by the broken line arrows 419_1, 419_2, respectively, in FIG. 4B. Accordingly, the hold state (e.g., operations of row 552 in FIG. 5A) is no longer used by the network operation implementations illustrated in FIG. 5B.

In some implementations, operations at 543-550 of FIG. 5B may be implemented by executing the operations described for steps 523-530, respectively, of FIG. 5A.

Operations at row 545 may denote execution of update rules for units/neurons within individual threads. In some implementations, the update rule evaluation may comprise updating an IF neuron membrane voltage and/or the parameters of a SRP neuron subsequent to execution of pre-events for that neuron. Partitioning the network in accordance with the methodologies described herein may enable asynchronous execution of operations at rows 543, 545 (e.g., as illustrated by back-to-front scheduling of operations 553, 554 for thread Td1 in FIG. 5B) as the synapses pertained to a given neuron and the neuron are operated within the same thread thereby alleviating the need for cross-thread synchronization (e.g., operation 124 in FIG. 1) may be removed.

Operations 547 may denote an evaluation whether (i) a given neuron has responded (e.g., generated a spike); and/or (ii) scheduling of one or more post-synaptic events based on the response generation by the neuron. Partitioning the network in accordance with the methodologies described herein may enable asynchronous execution of operations at rows 545, 547 (e.g., as illustrated by back-to-front scheduling of operations 554, 555 for thread Td1 in FIG. 5B) as the synapses pertained to a given neuron and the neuron are operated within the same thread thereby alleviating the need for cross-thread synchronization (e.g., operation 126 in FIG. 1) may be removed.

Operations at row 549 may denote execution of post-synaptic updates within individual threads. These operations may include executing STDP plasticity operations, updating eligibility traces, updating counters, and/or other post-synaptic update operations. Partitioning the network in accordance with the methodologies described herein may enable asynchronous execution of operations at rows 557, 559 (e.g., as illustrated by back-to-front scheduling of operations 556, 555 for thread Td1 in FIG. 5B) as the synapses pertained to a given neuron and the neuron are operated within the same thread thereby alleviating the need for the cross-thread synchronization of the prior art (e.g., operation 128 in FIG. 1) may be removed.

Operations at row 550 (e.g., 557) may be used allow completion of operation execution at row 549. Operations at row 530 may be referred to as the "output hold" in one or more realizations. The output hold duration may be configured to ensure that the greatest running thread operation duration from row 549 (e.g., the operation 544 for Td 2 in the implementation of FIG. 5B) is completed. In some implementations, this event propagation hold may be effectuated using an operating system call in which the system scheduler is instructed not to schedule execution of the operations at row 530 until some condition is met. For example, this condition may include a completion flag bit that is toggled, a neuron reaching a predetermined state, or some other indicator. In various implementations, a spinlock may be used to effect the hold. For example, multiple threads may share a common counter which is synchronized between then (protected memory accessible across threads). As operations complete the threads may increment the counter. When the counter reaches a predetermined value certain threads undergoing holds (or execution delay loops) may exit the hold/loop and begin execution. Upon completion of operation execution at rows 549 or at row 550, iteration counters may be incremented by individual threads 412_1, 412_2, 412_3, Comparing thread execution timing of FIG. 1 and FIG. 5B it may be determined that four hold stages per iteration (e.g., idle stage between rows 541-543, 543-545, 545-547, 547-549 in FIG. 5B) may be omitted. Comparing thread execution timing of FIG. 5A and FIG. 5B it may be determined that one hold stage per iteration (e.g., between rows 541-543 in FIG. 5AB) may be omitted in the implementation described with respect to FIGS. 4B, 5B.

Removal of these idle stages may decrease the overall duration of a given network iteration. Such reduction of iteration execution time may be traded for (i) an increased throughput of a neuromorphic processing apparatus (e.g., enabling the apparatus 410 of FIG. 4B to process a greater number of network iteration in a given time interval); and/or (ii) neuromorphic processing apparatus of reduced complexity, size and/or cost.

Figure 4C:
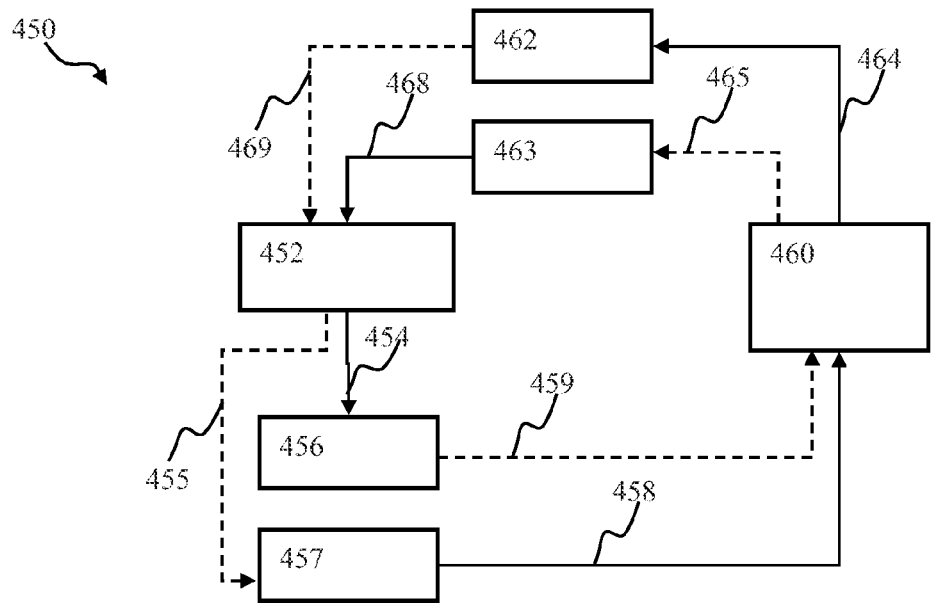
FIG. 4C is a block diagram illustrating use of read and write buffers for I/O operations during multithreaded operation of parallel network, in accordance with one or more implementations.

FIG. 4C illustrates a processing apparatus 450 configured to implement optimized asynchronous data communication for a parallel network (e.g., the network 200 in FIG. 2) without the use of the output hold stage (e.g., operations at row 530, 550 in FIGS. 5A-5B). In some implementations, the apparatus 450 may comprise a computerized apparatus (e.g., the apparatus 600 of FIG. 6) comprising one or more parallel processing elements (e.g., 602 in FIG. 6). It should be noted that in some implementations, that number of threads may match or not match the number of processing elements within computerized apparatus 600. For example, a number of threads less or equal to the number of processing elements may be used.

Block 452 in FIG. 4C may denote an individual thread that may be executed by multiple cores contemporaneous with other threads (not shown in FIG. 4C for clarity).

Individual thread (e.g., 452) may be afforded data buffers 462, 463, 456, 457. The buffers 462, 456 buffers may be configured for communicating data with the thread 452 and/or plant/environment 460 during odd iteration of network operation. The buffers 463, 457 may be configured for communicating data with the thread 452, and/or plant/environment 460 during event iteration of network operation. Data input into the buffers 456, 457 from the thread 452 corresponding to odd network iteration and even iteration is depicted by solid line arrow 454 and broken line arrow 455, respectively in FIG. 4C. Data output from the buffers 456, 457 from the thread 452 corresponding to odd network iteration and even iteration is depicted by solid line arrow 458 and broken line arrow 459, respectively in FIG. 4C. Data input into thread 452 from the buffers 462, 463 corresponding to odd network iteration and even iteration is depicted by solid line arrow 468 and broken line arrow 469, respectively in FIG. 4C. Data input into the buffers 456, 457 from the plant/environment 460 corresponding to odd network iteration and even iteration is depicted by solid line arrow 464 and broken line arrow 465, respectively in FIG. 4C.

Figure 10A:
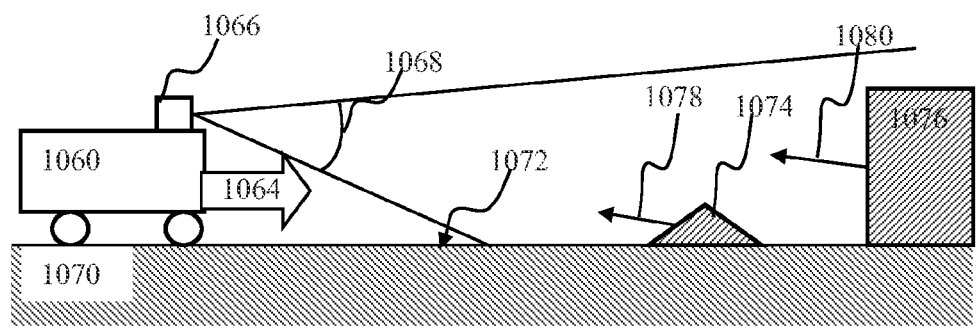
FIG. 10A is a graphical illustration depicting robotic apparatus comprising an adaptive controller apparatus of the disclosure configured for obstacle avoidance using multithreaded parallel network development methodology, in accordance with one or more implementations.
Figure 10B:
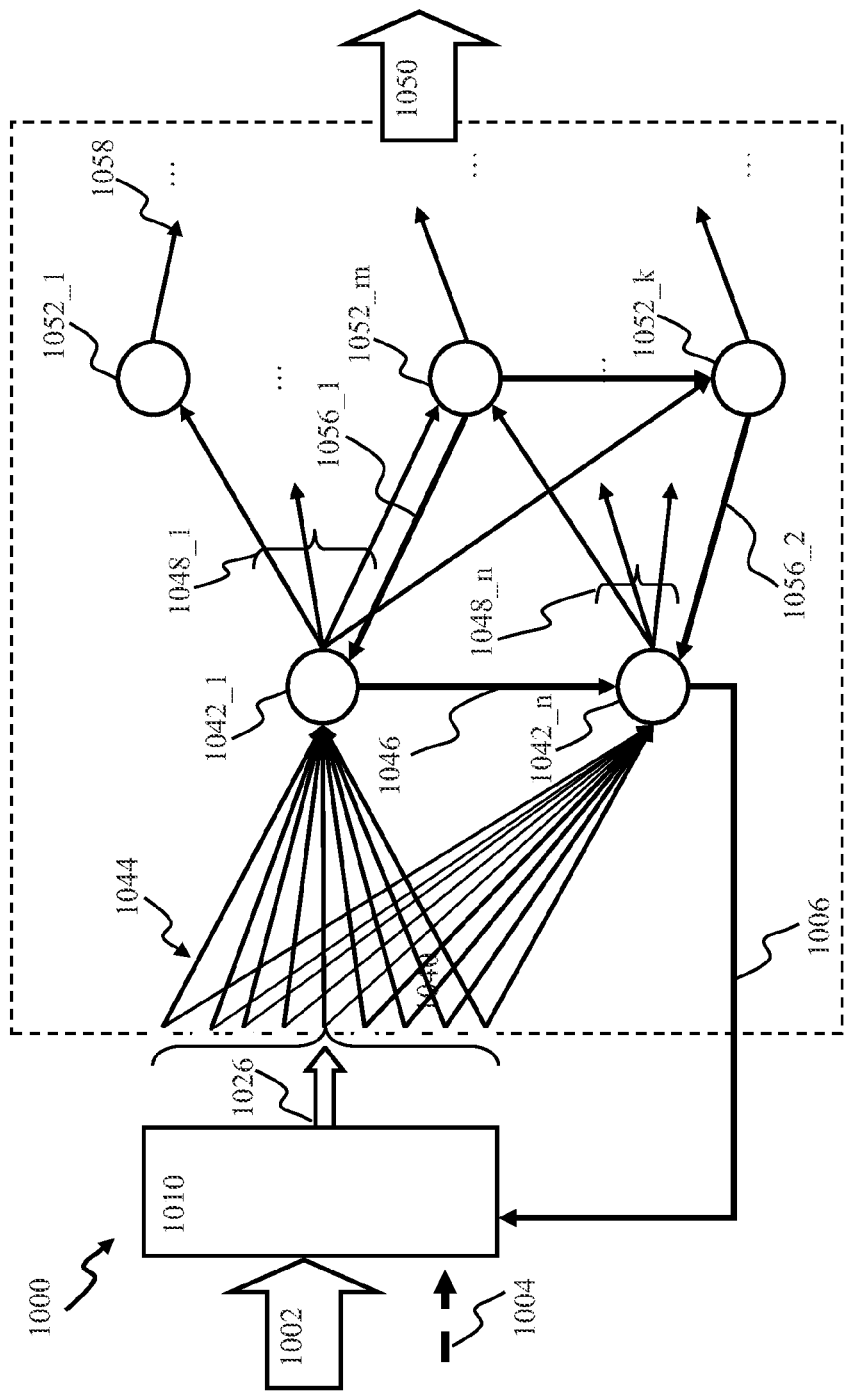
FIG. 10B is a block diagram illustrating a processing apparatus useful with an adaptive controller of a robotic device of FIG. 10A, in accordance with one or more implementations.

In one or more implementations, the data input into the buffers 462, 463 and/or thread 452 may comprise sensory input, e.g., the input 322 in FIG. 3 and/or input 1044 in FIG. 10B, plant feedback, human commands, reinforcement and supervision signals, and/or updates for parameters, weights, and/or thresholds. The output data buffers 456, 457 may be utilized for storing network output. In one or more implementations, the network output may comprise motor output, e.g., the output 344 in FIG. 3, object detection output (e.g., 1058 in FIG. 10B), and/or voltages, weights for analysis, output spiking associated with recognition.

The network, operable by the apparatus 450, may be partitioned using the partitioning methodology described with respect to FIGS. 4A, 4B, supra.

Figure 5C:
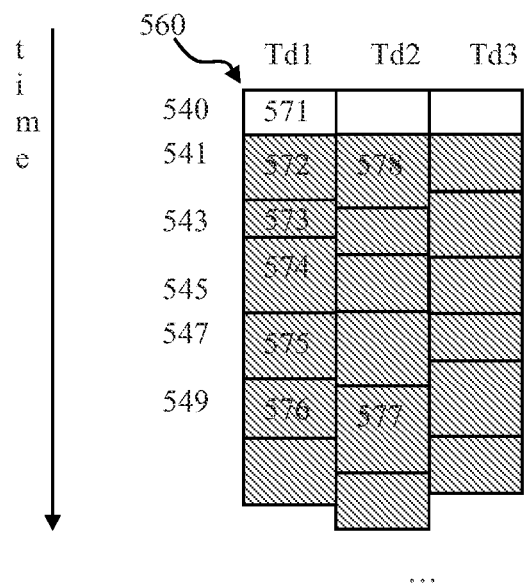
FIG. 5C is a graphical illustration depicting thread utilization corresponding to the multithreaded execution of FIG. 4C, in accordance with one or more implementations.

FIG. 5C illustrates one exemplary implementation of partitioned parallel network operation by the processing apparatus 450 of FIG. 4C. The table 560 illustrates operational stages of three threads (columns Td1, Td2, Td3) as a function of time (rows); individual rows (e.g., 540, 541, 543, 545, 547, 549) denote operational network stages. Open rectangles (e.g., 571) denote idle thread stages; hashed rectangles (e.g., 572) denote thread execution stages.

In one or more implementations, the operations (e.g., 571, 572, 573, 574, 575, 576) may denote the following operational network stages, e.g., as described with respect to FIG. 5B, supra, hold stage, event propagation, pre-synaptic rule evaluation, unit update rule, spike generation and/or post-synaptic event handling, and/or other operations.

Comparing thread operation implementation of FIG. 5C and FIG. 1, it may be noted that output hold operations (e.g., at rows 130 in FIG. 1) may be eliminated using the processing apparatus architecture shown in FIG. 4C. By way of a non-limiting illustration, network input/output operations may be described as follows:

Responsive to execution of operations at row 549 in FIG. 5C (e.g., operations 576) for an odd network iteration, the thread 452 may write network output (e.g., motor commands) into the buffer 456, as depicted by the arrow 454. The data written at operation 576 into, e.g., buffer 456, may be utilized by the plant, or supervisory agent (e.g. analysis tool, human, and/or other agent) at a subsequent network iteration. Contemporaneously with the write activity by the operation 576, other network entities (e.g., another thread 577 operation at row 549 in FIG. 5C and/or the plant 460 in FIG. 4C) may access contents of the output network buffer 457, as shown by the arrow 458.

Responsive to execution of operations at row 549 in FIG. 5C (e.g., operations 576) for even network iteration, the thread 452 may write network output (e.g., motor commands) into the buffer 457, as depicted by the arrow 455 FIG. 4C. Contemporaneously with the write activity by the operation 576, other network entities (e.g., another thread 577 operation at row 549 in FIG. 5C and/or the plant 460 in FIG. 4C) may access contents of the output network buffer 456, as shown by the arrow 459 in FIG. 4C.

Responsive to execution of operations at row 549 in FIG. 5C (e.g., operations 576) for odd network iteration, the thread 452 may write network output (e.g., motor commands) into the buffer 456, as depicted by the arrow 454 FIG. 4C. Contemporaneously with the write activity by the operation 576, other network entities (e.g., another thread 577 operation at row 549 in FIG. 5C and/or the plant 460 in FIG. 4C) may access contents of the output network buffer 457, as shown by the arrow 458 in FIG. 4C.

Responsive to execution of operations at row 541 in FIG. 5C (e.g., operations 572) for even network iteration, the thread 452 may read network input (e.g., plant feedback and/or sensory video input) from the buffer 462, as depicted by the arrow 469 in FIG. 4C. Contemporaneously with the read activity by the operation 572, other network entities (e.g., another thread 578 operation at row 541 in FIG. 5C and/or the plant 460 in FIG. 4C) may write data into the buffer 463, as shown by the arrow 465 in FIG. 4C.

Responsive to execution of operations at row 541 in FIG. 5C (e.g., operations 572) for odd network iteration, the thread 452 may read network input (e.g., plant feedback and/or sensory video input) from the buffer 463, as depicted by the arrow 468 in FIG. 4C. Contemporaneously with the read activity by the operation 572, other network entities (e.g., another thread 578 operation at row 541 in FIG. 5C and/or the plant 460 in FIG. 4C) may write data into the buffer 462, as shown by the arrow 464 in FIG. 4C.

In one or more implementations, a custom-made barrier (e.g., a spinlock barrier) may be utilized for thread synchronization with the network operation realization described with respect to FIGS. 4C, 5C.

Comparing thread execution timing of FIG. 1 and FIG. 5C it may be determined that one hold stage per iteration (e.g., the output hold stage 130 in FIG. 1) may be omitted. Comparing thread execution timing of FIG. 5C with the execution timing of FIGS. 5A-5B it may be determined that one hold stage per iteration may be omitted using dual input/output buffer configuration shown in FIG. 4C.

Removal of the output hold stage may decrease the overall duration of a given network iteration. Such reduction of iteration execution time may be traded for (i) an increased throughput of a neuromorphic processing apparatus (e.g., enabling the apparatus 410 of FIG. 4B to process a greater number of network iteration in a given time interval); and/or (ii) neuromorphic processing apparatus of reduced complexity, size and/or cost.

In some implementations, individual threads may be configured to utilize shared connectivity store (e.g., a global table storing information about every synapse of the network 200 using global IDS that may be accessible by individual threads).

One realization of such global connectivity is presented in Table 2, wherein connections between input neurons (represented by rows) and output neurons (represented by columns) are denoted by symbols 'X':

TABLE 2

|   | 1 | 2 | 3 | 4 | 5 |
|---|---|---|---|---|---|
| 1 |   | X | X |   |   |
| 2 |   |   |   | X | X |
| 3 | X | X |   |   |   |
| 4 |   |   |   |   |   |
| 5 |   | X | X |   |   |

In some implementations of sparsely connected networks (e.g., as shown in Table 2) only a portion of table cells are used.

The network illustrated in Table 2 may be partitioned using methodology described herein as follows:

Partition 1 may comprise neurons N1, N3 and synapses S31, S13, S53 providing input to the neurons N1, N3; and Partition 2 may comprise neurons N2, N4, N5, and synapses S12, S32, S24, S25, S52 providing input to the neurons N2, N4, N5.

As used herein, the notation Sij denotes a synapse connection from ith neuron to jth neuron.

It may be desirable to partition global connectivity table (e.g., Table 2) into local tables, configured to be accessible by respective parallel executor (e.g., a thread) configured to operate a given partition. Such local tables may facilitate data integrity, reduce collisions and/or lock conditions that may occur responsive to the access of a single table element by multiple threads. In some implementations local connectivity tables may be configured as follows:

TABLE 3

| partition 1 | |
|---|---|
| Neuron ID | Synapse ID |
| 1 | S13 |
| 3 | S31 |
| 5 | S53 |

TABLE 4

| partition 2: | | |
|---|---|---|
| Neuron ID | Synapse ID | Synapse ID |
| 1 | S12 | |
| 2 | S24 | S25 |

TABLE 4-continued

| partition 2: | | |
|---|---|---|
| Neuron ID | Synapse ID | Synapse ID |
| 3 | S32 | |
| 5 | S52 | |

As may be noted, blank rows in Tables 3-4 may be removed (e.g., rows 2, 4 in Table 3 and row 4 in Table 4) in order to reduce memory use. Such table compression may necessitate search for target entries when performing event updates. Responsive to an event associated with a neuron (e.g., spike generation by neuron 5), executor 2 may be required to parse the connectivity Table 4 in order to determine synapses (e.g., synapse S52) for delivering the spike to target neurons (e.g., neuron 2). Various approaches exist for searching through global connectivity tables, such as, for example, logarithmic search, sorting, hash tables, stochastic search, and/or direct search. Search operations may cause additional computational load that may scale with, e.g., number of source neurons for logarithmic search.

In some implementations configured to reduce computational load during network updates, local connectivity tables may be configured to utilized neuron IDs that are local to a given thread. Tables 5-6 illustrate one realization of local connectivity tables comprising local neuron IDs that correspond to connectivity map of Table 2:

TABLE 5

| partition 1 |
|---|
| Synapse ID |
| S13 |
| S31 |
| S53 |

TABLE 6

| partition 2: | |
|---|---|
| Synapse ID | Synapse ID |
| S12 | |
| S24 | S25 |
| S32 | |
| S52 | |

It is noteworthy that individual rows in Tables 5-6 correspond to neurons that are local to the partition comprise a contiguous representation thereby alleviating need for a search. The additional memory required by local connectivity tables may scale with number of neurons and number of executors (e.g., threads).

When operating parallel networks comprising many synapses (e.g., in excess of 1,000,000) such searches may become time consuming (e.g., 100 ms per step) and cause network operation delays. In some implementations of multithreaded networks, it may be desirable to reduce cross thread traffic related to neuron connectivity. Global connectivity table implementations may cause, for example, individual processors/cores associated with individual threads to load the connectivity table it into its own cache during spike propagation. Loading of large tables into cache of ever processor/core may slow down network operation.

Figure 7A:
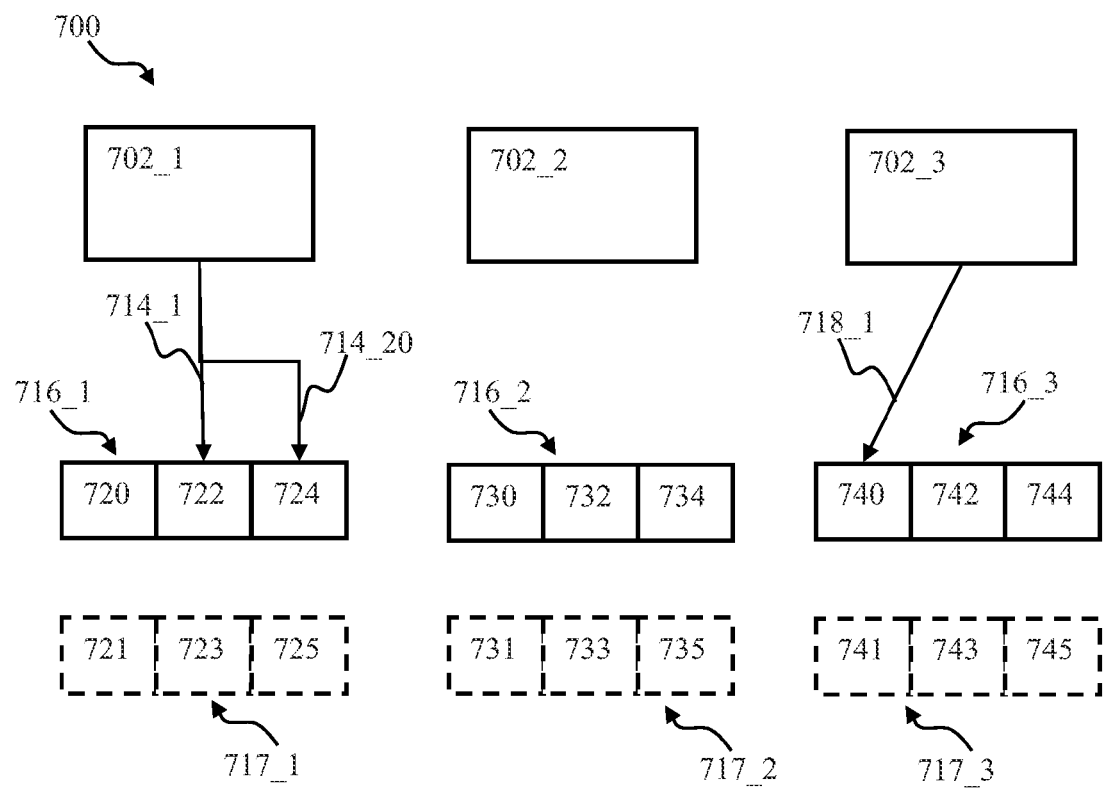
FIG. 7A is a block diagram illustrating data communication by multiple parallel threads utilizing distributed connectivity storage during an odd iteration of parallel network operation, in accordance with one or more implementations.
Figure 7B:
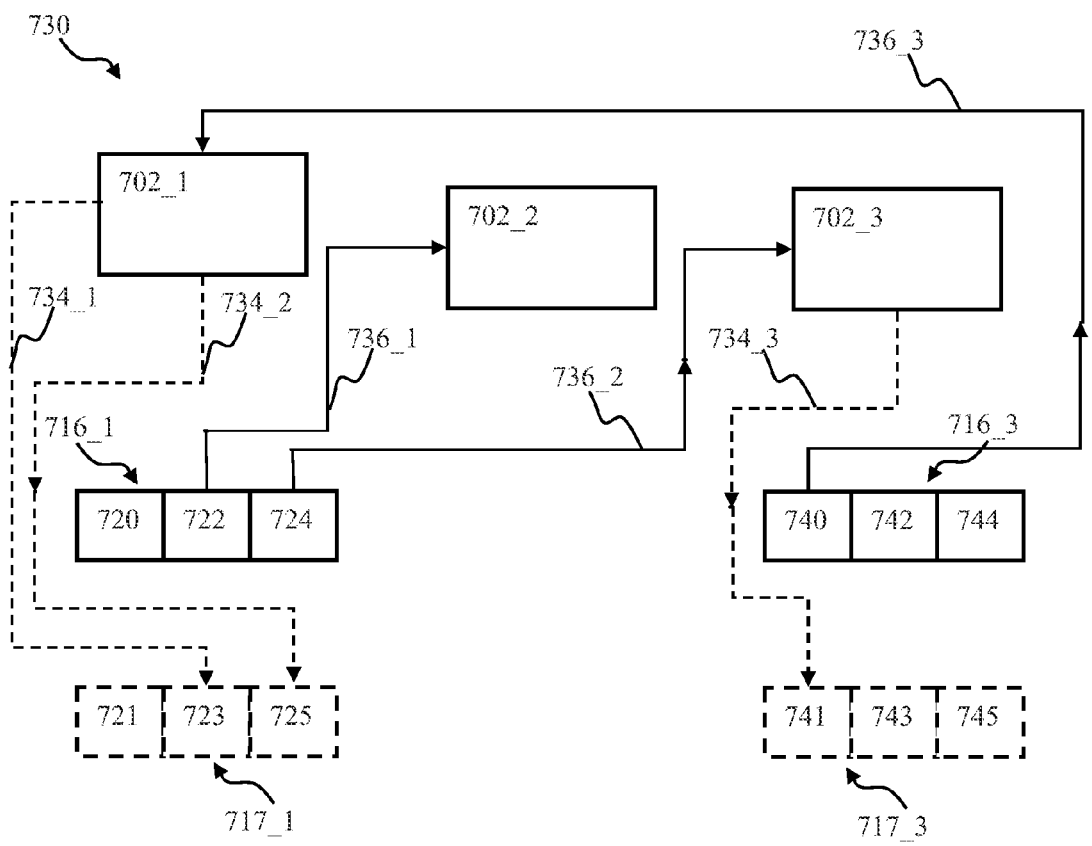
FIG. 7B is a block diagram illustrating data communication by multiple parallel threads utilizing distributed connectivity storage during an even iteration of parallel network operation, in accordance with one or more implementations.

FIGS. 7A-7B illustrate parallel thread operation comprising distributed connectivity storage by a computerized processing apparatus configured to optimize operation of a large multithreaded parallel network. In some implementations, the apparatus configured to implement methodology illustrated in FIGS. 7A-7B may comprise a computerized apparatus (e.g., the apparatus 600 of FIG. 6) comprising one or more parallel processing elements (e.g., 602 in FIG. 6) configured to operate parallel network in excess of 100,000 neurons and/or 1,000,000 synapses. The network described with respect to FIGS. 7A-7B may be partitioned using methodology described with respect to FIGS. 4A, 4B, supra. Configuration 700 of FIG. 7A depicts data flow associated with odd iteration of network operation, according to one or more implementations. configuration 730 of FIG. 7B depicts data flow associated with even iteration of network operation, according to one or more implementations.

The configuration 700 may be configured to operate tree or more threads 702 contemporaneously with one another. Individual threads 702_1, 702_2, 702_3 may be afforded N pairs of odd iteration data buffer blocks 716 and even iteration data buffer blocks 717, wherein N corresponds to the number of threads operable contemporaneously (e.g., N=3 in FIGS. 7A-7B). The data buffer blocks 716 may be used to store neuron data that may be generated during odd iteration of the network; the data buffer blocks 717 may be used to store neuron data that may be generated during even iteration of the network.

For a given thread, buffers within the buffer block (e.g., the buffer 720 within the block 716_1) may be utilized to store neuron data comprising a portion of the of connectivity table that may describe connectivity for the neurons operable by that thread. By way of illustration, for the operation the network 200 of FIG. 2, the thread 702_1 may operate the neuron 202 of FIG. 2. The buffers 716_1, 717_1 in FIGS. 7A-7B may store data related to the neuron 202. Data from the buffers 716_1, 717_1 may be communicated to the threads 702_2, 702_3 that may operate neurons 204, 206, respectively.

In some implementations, data stored in the buffer 722 may comprise the following description of connectivity between the neuron 202 and the neuron 204:

202: 204 in Thread 702_2

Data stored in the buffer 723 may comprise the following description of connectivity between the neuron 202 and the neuron 206 for 702_3:

202: 206 in Thread 702_3

Similarly, data stored in the buffer 740 may comprise the following description of connectivity between the neuron 206 and with the neuron 202:

206: 202 in thread 702_1.

Individual buffers within the buffer blocks 716, 717 may be utilized to store data related to activity of individual neurons (e.g., 202) operable by a given thread. In some implementations, the activity data may comprise timing of a spike generated by the neuron. In the implementation illustrated in FIGS. 7A-7B:

the buffers 716_1, 717_1 may be utilized for storing spike activity of neurons (e.g., 202) operable by the thread 702_1 for use by: (i) the neurons operable by thread 702_1 (the buffers 720, 721); (ii) the neurons operable by thread 702_2 (the buffers 722, 723); and (iii) the neurons operable by thread 702_3 (the buffers 724, 725);

the buffers 716_2, 717_2 may be utilized for storing spike activity of neurons (e.g., 204) operable by the thread 702_2 for use by: (i) the neurons operable by thread 702_1 (the buffers 730, 731); (ii) the neurons operable by thread 702_2 (the buffers 732, 733); and (iii) the neurons operable by thread 702_3 (the buffers 734, 735); and the buffers 716_3, 717_3 may be utilized for storing spike activity of neurons (e.g., 206) operable by the thread 702_3 for use by: (i) the neurons operable by thread 702_1 (the buffers 740, 741); (ii) the neurons operable by thread 702_2 (the buffers 742, 743); and (iii) the neurons operable by thread 702_3 (the buffers 744, 745).

Data flow corresponding to operation of network 200 during odd iteration (e.g., iteration 1) is depicted in FIG. 7A. Responsive to one or more spikes by the neuron 202 operable by the thread 702_1, spike data may be stored in the odd buffer queues 722, 724, as depicted by the arrows 714_1, 714_2, for subsequent consumption by the threads 702_2, 702_3. Responsive to one or more spikes by the neuron 206 operable by the thread 702_3, spike data may be stored in the odd buffer queue 740, as depicted by the arrows 718_1, for subsequent consumption by the thread 702_1.

Data flow corresponding to operation of network 200 during even iteration (e.g., iteration 2) is depicted in FIG. 7B. Responsive to one or more spikes by the neuron 202 operable by the thread 702_1, spike data may be stored in the even buffer queues 723, 724, as depicted by the arrows 734_1, 734_2, for subsequent consumption by the threads 702_2, 702_3. Responsive to one or more spikes by the neuron 206 operable by the thread 702_3, spike data may be stored in the odd buffer queue 741, as depicted by the arrow 734_3, for subsequent consumption by the thread 702_1. Consumption of the spike data from the prior iteration by the threads 702_1, 702_2, 702_3 is depicted by arrows 736_1, 736_2, 736_3, respectively, in FIG. 7B.

In one or more implementations, data consumption by a given thread (e.g., the thread 702_1) may comprise read access to queue buffers in buffer blocks of one or more other threads that are designated to the given thread (e.g., the buffer 740 of the thread 702_3 buffer block 716_3). The read access pseudo-code may be expressed as:

7. for THREAD in ALL_THREADS
8. {
9. get neuron ids that spiked in THREAD from THREAD.queues[THIS_THREAD];
10. use ids and local connectivity table to schedule presynaptic events;
11.}

Listing 2

Distributed connectivity implementation for multithreaded parallel networks, e.g., as shown and described with respect to FIGS. 7A-7B, may enable memory access locality for individual thread configured such that processor-specific memory cache utilization may be optimized in one or more respects.

In some implementations, this optimization may be executed by distributing only minimal information for each neuron (one or more identifiers only (e.g. thread ID and/or local ID)). Further, in various implementations, only the local ID may be distributed, and the local ID's distribution may be limited to the local thread. By way of non-limiting example, for global IDs, to locate synapses for multiple neurons in one thread with connections to a second thread, a tree search of a multi-table data structure must be utilized. For local IDs only, there is no need for to add an extra table for the second thread. Thus, the tree search is advantageously obviated.

In some implementations aimed to reduce memory used associated with activity queues, a single memory queue may be used to store activity data related to neurons of the same thread for even and odd iteration. For example, a single buffer 720 or 721 may be used to store activity of neurons of thread 702_1 during even and odd iterations; a single buffer 732 or 733 may be used to store activity of neurons of thread 702_2 during even and odd iterations; a single buffer the 744 or 745 may be used to store activity of neurons of thread 702_3 during even and odd iterations.

FIGS. 8A-8D illustrate methods 800, 820, 840 of operating parallel networks utilizing multithreaded methodology of the disclosure. The operations of methods 800, 820, 840 presented below are intended to be illustrative. In some implementations, method 800, 820, 840, 860 may be accomplished with one or more additional operations not described, and/or without one or more of the operations discussed. Additionally, the order in which the operations of method 800, 820, 840, 860 are illustrated in FIGS. 8A-8D and described below is not intended to be limiting.

In some implementations, method 800, 820, 840, 860 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 800, 820, 840, 860 in response to instructions stored electronically on an electronic storage medium. The one or more processing devices may include one or more devices configured through hardware, firmware, and/or software to be specifically designed for execution of one or more of the operations of methods 800, 820, 840, 860.

Figure 8A:
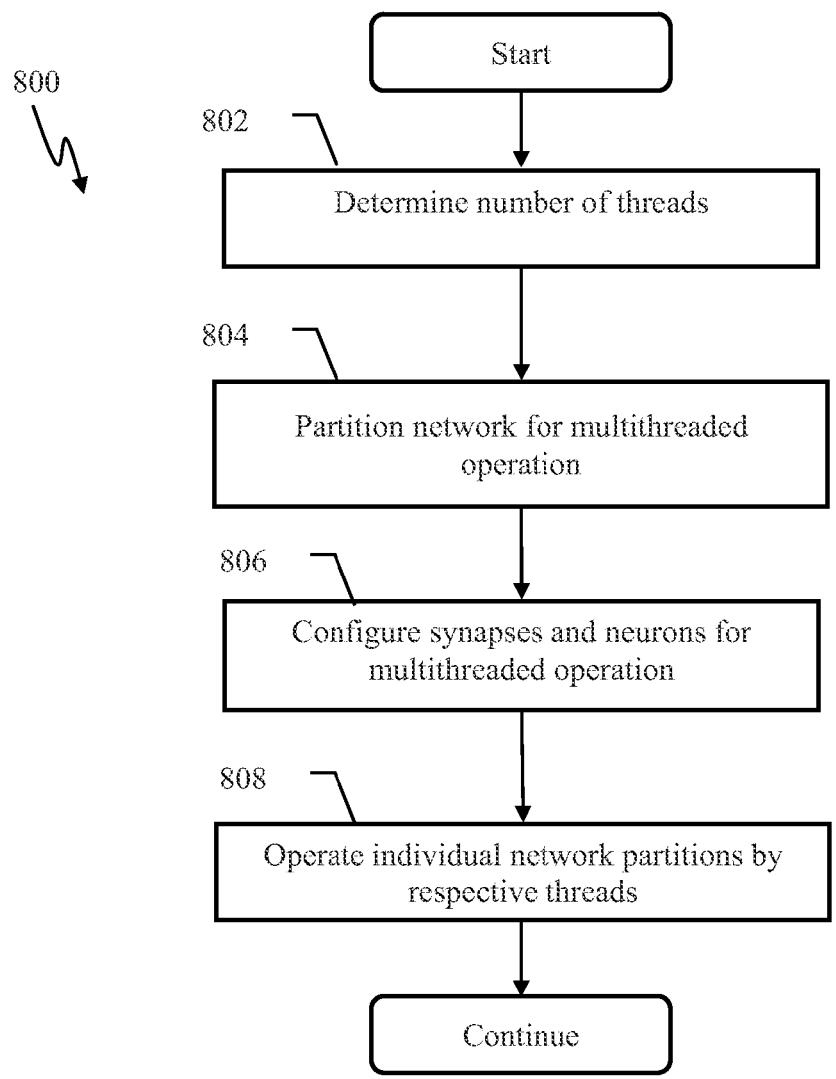
FIG. 8A is logical flow diagram illustrating a method of network partitioning used for multithreaded network operation, in accordance with one or more implementations.

FIG. 8A illustrating a method of partitioning a parallel network for multithreaded network operation, in accordance with one or more implementations. In some implementations, the network may comprise multiple interconnected nodes (e.g., the network 200) operable by a parallel processing platform (e.g., the multicore processor 600 of FIG. 6 and/or neuromorphic processing system 1150 of FIG. 11C).

At operation 802 of method 800 of FIG. 8A, a number of threads that may be operable in parallel may be determined. This number may be determined from preset parameters (e.g. embedded in code), or calculated from a functional relationship to the number of cores in the system. In various implementations, the preset parameters may be set using human input, statistical modeling, theoretical modeling, or empirical analysis. In some implementations of operating a parallel networks by multi-core processors (e.g., CPU, DSP) the number of parallel threads may correspond to the number of individual physical/virtual processor cores. In some implementations of operating a parallel networks by massively parallel processors (e.g., GPU with 100-1000 cores), the number of parallel threads may be determined using one or more of the methods discussed above.

At operation 804, the network may be partitioned. In one or more implementations, configured to reduce cross-thread traffic and/or reduce number of synchronization locks, network may be partitioned such that for a given network portion, the neurons and the input synapses into neurons within the portion are executed within the same thread, e.g., as described with respect to FIG. 4A.

At operation 806 synapses may be configured for multithreaded operation. In one or more implementations, synapse update rules may be configured such that to (1) allow access to memory of a post-synaptic neurons (e.g., the neuron 206 for the synapse 216 in FIG. 2); forbid memory access to pre-synaptic neurons (e.g., the neuron 202 for the synapse 216 in FIG. 2).

At operation 808 of method 800, individual network partitions may be operated by respective threads. Thread operation 808 may comprise data communication between network partitions. In one or more implementations, network operation may comprise optimized operation architecture described with respect to FIGS. 4A-4C, 5A-5C, 7A-7B supra and/or operations of method 820 described infra. Network partitioning and/or synapse configuration may advantageously enable reduction of number of thread synchronization states (e.g., operations 124, 126, 128, and 130) when compared to the prior art. Multithreaded network operation characterized by fewer synchronization states may be used to increase throughput of a given processing apparatus and/or allow for a utilization of a less costly and/or simpler processing devices for a given task.

Figure 8B:
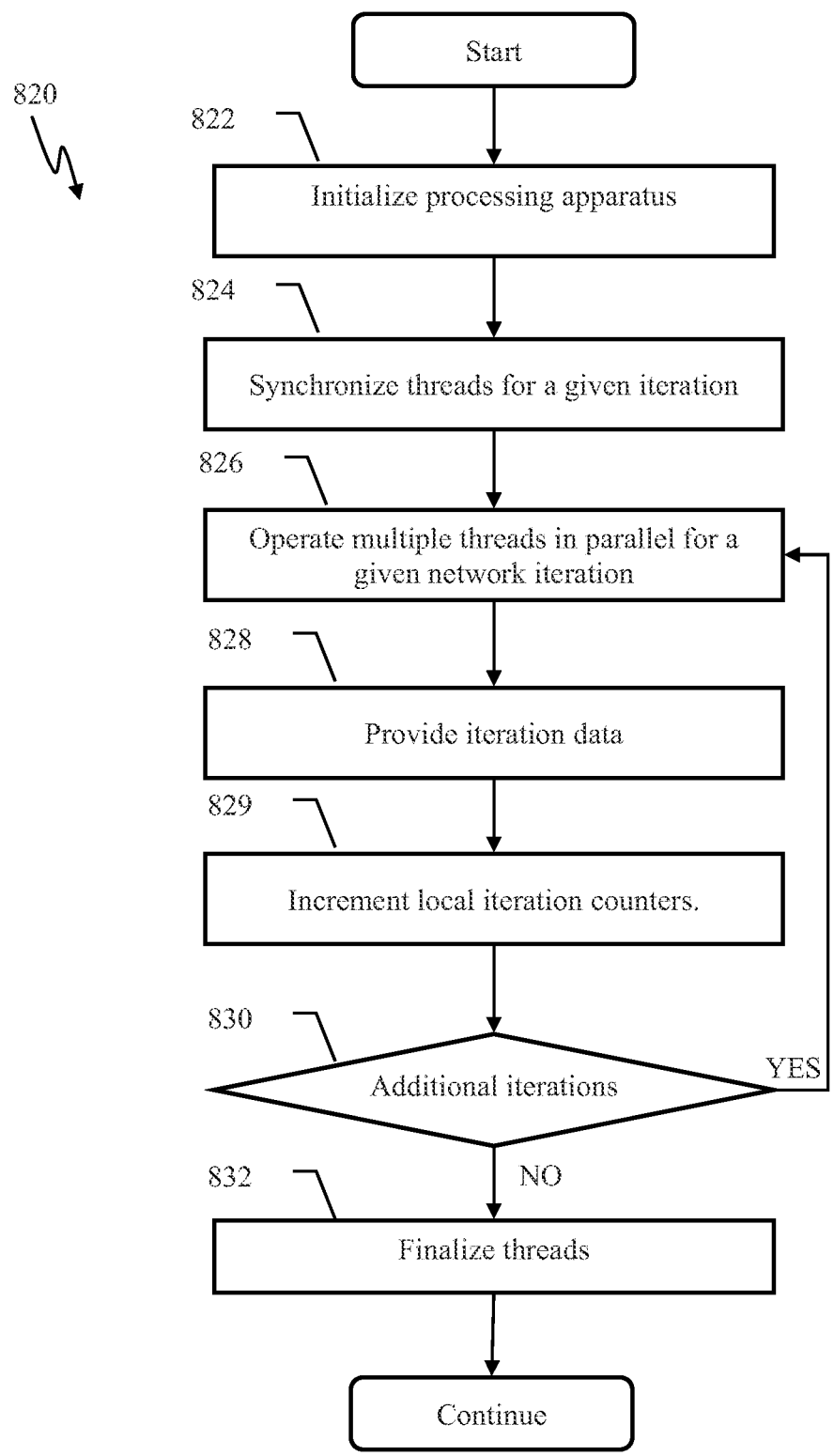
FIG. 8B is logical flow diagram illustrating a method of multithreaded network operation, in accordance with one or more implementations.

FIG. 8B illustrates a method of parallel network operation using multiple threads executable contemporaneous with one another. In some implementations, the network may comprise multiple interconnected nodes (e.g., the network 200) operable by a parallel processing platform (e.g., the multi-processor cluster, multicore processor 600 of FIG. 6 and/or neuromorphic processing system 1150 of FIG. 11C).

At operation 822 of method 820 of FIG. 8B the processing apparatus may be initialized. In one or more implementations, the initialization operations 822 may comprise one or more of: neuron and synapse memory allocation, initialization of neuron and synapse process variables (e.g., initial neuron excitability and/or synapse weight), initialization of partition connectivity matrices and assignment of node identifications (IDs); generation of threads, thread locks, lock barriers; partitioning of the network assignment network partitions to respective threads, initialization of local thread iteration counters (e.g., set individual counters to zero) and/or other operations. In some implementations, initialization operations 822 may comprise one or more of operations of method 800 described supra.

At operation 824 threads for a given iteration may be synchronized with one another. In some implementations, the synchronization may be effectuated by verifying that local counter values match across individual threads. For example, multiple threads may share a common counter which is synchronized between then (protected memory accessible across threads). Different threads may increment the counter and the change is registered across threads.

Ad operation 826 multiple threads may be operated in parallel with one another by the processing apparatus for a given network iteration. In one or more implementations, thread operation may comprise one or more of: pre-synaptic event scheduling (taking into account delays when appropriate); execution of pre-events from pre-synaptic event queues; execution of neuron and synapse update rules; execution of post-synaptic events; storing spike data (when appropriate) into even/odd spike buffers (e.g., 457, 456 in FIG. 4C). In some implementations, pre-synaptic event scheduling may comprise reading of IDs of neurons that spikes from (odd/even) spike queues; and storing pre-synaptic events into pre-synaptic event queues (container of pointers inside each thread). In one or more implementations, thread operation 826 may comprise one or more procedures described with respect to FIGS. 5A-5C, above.

At operation 828, iteration data may be provided. In one or more implementations, the network partition output (e.g., motor commands) may be stored in odd/even buffers (e.g., the buffers 456, 457 of FIG. 4C).

At operation 829 local counters may be incremented and verification may be performed to confirm that local counter values match across individual threads At operation 830 a determination may be made as to whether additional iterations are to be performed. Responsive to a determination that additional iterations are to be performed, the method may proceed to operation 826.

Responsive to a determination that additional iterations are to be performed, the method may proceed to operation 832 wherein individual threads may be finalized. In one or more implementations, thread finalization may comprise one or more of holding for threads to stop execution; thread resource de-allocation (e.g., locks, memory and/or other resources).

Figure 8C:
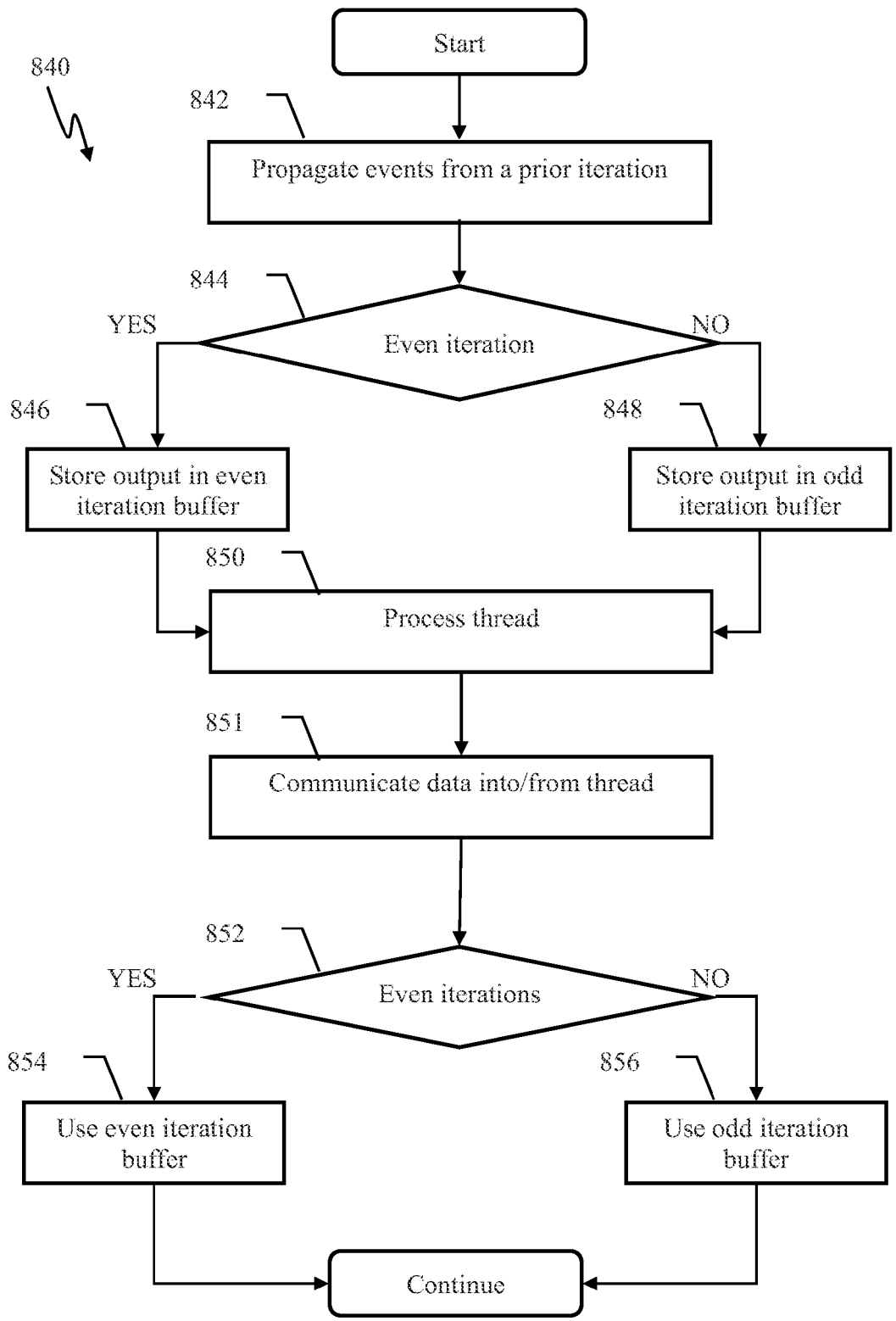
FIG. 8C is logical flow diagram illustrating a method of using an even/odd iteration buffer for optimizing multithreaded network operation, in accordance with one or more implementations.

FIG. 8C illustrates a method of using even/odd iteration buffer for optimizing multithreaded network operation, in accordance with one or more implementations. In some implementations, the network may comprise multiple interconnected nodes (e.g., the network 200) operable by a parallel processing platform (e.g., the multi-processor cluster, multicore processor 600 of FIG. 6 and/or neuromorphic processing system 1150 of FIG. 11C).

At operation 842 of method 840 of FIG. 8C events from a prior iteration may be applied. In some implementations, operations 842 may comprise propagation of spikes that may have been generated (at, e.g., operations of row 549 of FIG. 5B at a preceding iteration). Operations 842 may comprise spike delivery and/or collect all pre-synaptic events within an associated partition for execution. Upon completing operations 842 network data (e.g. neuron identifiers for spiking neurons and/or associated spike payloads, voltages, spikes, and weights for the odd/even buffers) generated individual threads may need to be stored.

At operation 844 a determination may be made as to whether the operations 842 correspond to even or odd network iteration. Responsive to determination that this is even iteration, output data obtained at operation 842 may be stored in even iteration buffer (e.g., 416 in FIG. 4B) at operation 846.

Responsive to a determination that an odd iteration is currently occurring, output data obtained at operation 842 may be stored in odd iteration buffer (e.g., 417 in FIG. 4B) at operation 848.

The method 840 may proceed to operation 850 wherein thread may be further operated to perform network computations (e.g., one or more network operations of rows 543, 545, 547, 549 described above with respect to FIG. 5B).

At operation 851 data may be communicated to/from network. In one or more implementations, data communication of operation 851 may comprise one or more of data input into the threads and/or network data output. In some implementations, input data may comprise sensory input (e.g., 322 in FIG. 3 and/or input 1044 in FIG. 10B), plant feedback, human commands, reinforcement and supervision signals, and/or updates for parameters, weights, and/or thresholds). In some implementations, network output may comprise motor output, e.g., the output 344 in FIG. 3, object detection output (e.g., 1058 in FIG. 10B), and/or voltages, weights for analysis, output spiking associated with recognition.

At operation 852 a determination may be made as to whether the operations 851 correspond to even or odd network iteration. Responsive to determination that this is even iteration, method 840 may proceed to operation 854 wherein thread output data obtained at operation 851 may be stored in even iteration buffer (e.g., 457 in FIG. 4C); and/or data input may be provided into the thread from even iteration data buffer (e.g., 463 in FIG. 4C).

Responsive to a determination that an odd iteration is occurring, method 840 may proceed to operation 856 wherein thread output data obtained at operation 851 may be stored in odd iteration buffer (e.g., 456 in FIG. 4C); and/or data input may be provided into the thread from odd iteration data buffer (e.g., 462 in FIG. 4C).

Figure 8D:
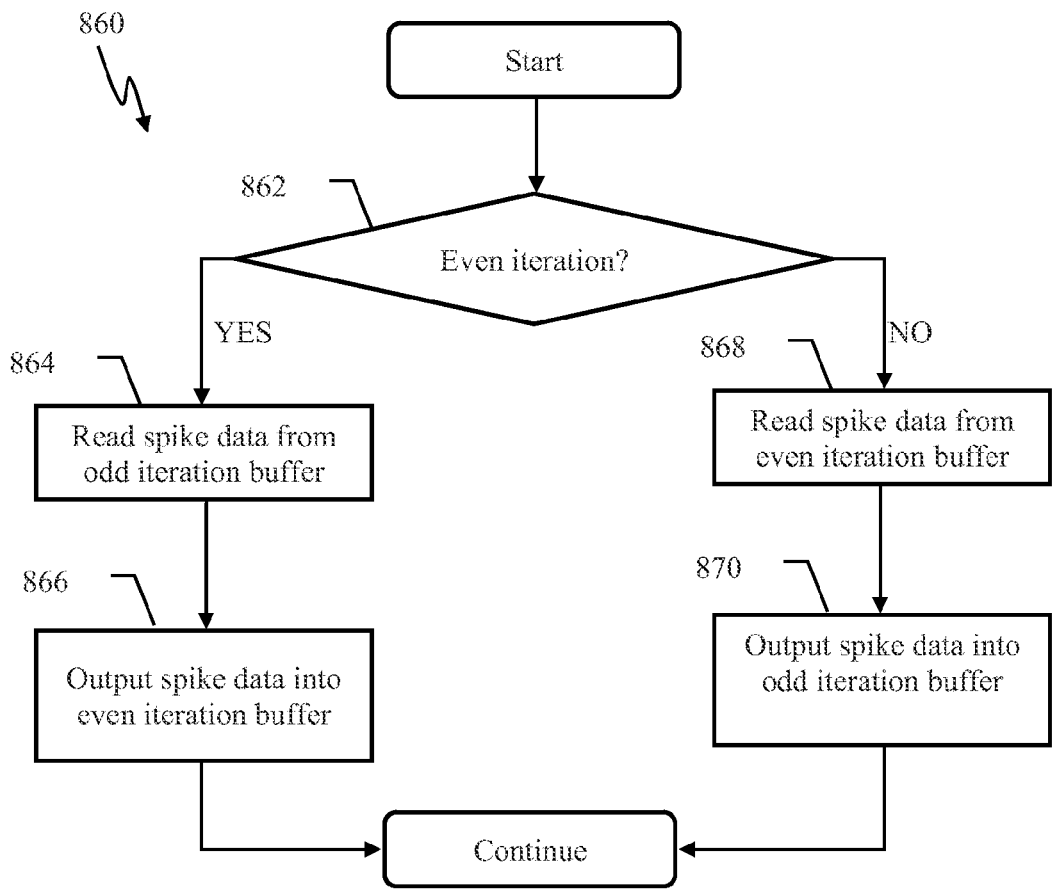
FIG. 8D is logical flow diagram illustrating a method of using distributed connectivity mapping and even/odd input/output data buffer for optimizing cross-thread data exchange in a multithreaded network operation, in accordance with one or more implementations.

FIG. 8D illustrates a method of using distributed connectivity mapping and even/odd input/output data buffer for optimizing cross-thread data exchange in a multithreaded network operation, in accordance with one or more implementations. In some implementations, the network may comprise multiple interconnected nodes (e.g., the network 200) operable by a parallel processing platform (e.g., the multi-processor cluster, multicore processor 600 of FIG. 6 and/or neuromorphic processing system 1150 of FIG. 11C).

At operation 862 of method 860 of FIG. 8D determination may be made as to whether the current thread execution state corresponds to even or odd network iteration. Responsive to determination that this is even iteration, method 860 may proceed to operation 864.

At operation 864 thread output data may be stored in even iteration buffer (e.g., 723, 725 in FIG. 7B). In some implementations, the output data may comprise neuron output spike data associated with neuron population operable by a given thread.

At operation 866 input data into the thread, corresponding to preceding iteration, may be provided from odd iteration data buffer (e.g., 740 in FIG. 7B).

Responsive to determination at operation 862 that an odd iteration is occurring, method 860 may proceed to operation 868.

At operation 868 thread output data may be stored in odd iteration buffer (e.g., 722, 724 in FIG. 7A). In some implementations, the output data may comprise neuron output spike data associated with neuron population operable by a given thread (e.g., thread 702_1).

At operation 870 input data into the thread, corresponding to preceding iteration, may be provided from odd iteration data buffer (e.g., 741 in FIG. 7A).

Multithreaded parallel network operation methodology described herein may be utilized in a variety of processing apparatus configured to, for example, implement target approach and/or obstacle avoidance by autonomous robotic devices and/or sensory data processing (e.g., object recognition).

Figure 9:
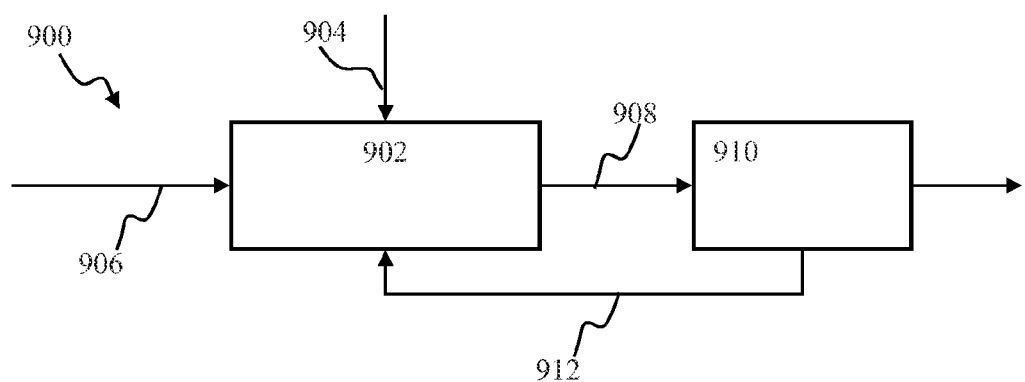
FIG. 9 is a block diagram illustrating an adaptive controller apparatus comprising a parallel network configured to be operable in accordance with multithreaded execution methodologies, according to one or more implementations.

FIG. 9 illustrates one implementation of an adaptive robotic apparatus 900 comprising the adaptive controller 902 and a plant (e.g., robotic platform) 910. The controller 902 may be configured to generate control output 908 for the plant 910. The output 908 may comprise one or more motor commands (e.g., pan camera to the right), sensor acquisition parameters (e.g., use high resolution camera mode), commands to the wheels, arms, and/or other actuators on the robot, and/or other parameters. The output 908 may be configured by the controller 902 based on one or more sensory inputs 906. The input 906 may comprise data used for solving a particular control task. In one or more implementations, such as those involving a robotic arm or autonomous robot, the signal 906 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as that involving object recognition, the signal 906 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 906 may comprise a target motion trajectory. The motion trajectory may be used to predict a future state of the robot on the basis of a current state and the target state. In one or more implementations, the signals in FIG. 9 may be encoded as spikes.

The controller 902 may be operable in accordance with a learning process (e.g., reinforcement learning and/or supervised learning). The learning process may be configured based on a teaching signal 904 and/or plant feedback 912. In one or more implementations, the controller 902 may optimize performance (e.g., performance of the system 900 of FIG. 9) by minimizing average value of a performance function as described in detail in co-owned and co-pending U.S. patent application Ser. No. 13/487,533, entitled "SYSTEMS AND APPARATUSES FOR IMPLEMENTING TASK-SPECIFIC LEARNING USING SPIKING NEURONS", incorporated herein by reference in its entirety.

The adaptive controller 902 may comprise a parallel network multiple interconnected neurons. Individual neurons may be operable independent from one another thereby enabling parallel computations. Neurons may communicate with one another within network using a variety of methods. In some implementations, the neurons may comprise rate-based process and data may be encoded into a scalar and/or a vector neuron output. In one or more implementations, the network (e.g., of the adaptive controller 902) may comprise spiking neurons, e.g., as the neuron 340 described with respect to FIG. 3, supra.

One approach to object recognition and/or obstacle avoidance may comprise processing of optical flow using a spiking neural network apparatus comprising for example the self-motion cancellation mechanism, such as described, for example, in co-owned and co-pending U.S. patent application Ser. No. 13/689,717, entitled "APPARATUS AND METHODS FOR OBJECT DETECTION VIA OPTICAL FLOW CANCELLATION", filed Nov. 30, 2012, the foregoing being incorporated herein by reference in its entirety.

FIG. 10B illustrates a processing apparatus configured to implement object recognition and/or obstacle avoidance and useful with an adaptive controller of a robotic device of FIG. 10A. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates (whether regular or aperiodic) are equally useful with the principles and architectures described herein. The apparatus 1000 may be embodied in, for example, an autonomous robotic device, e.g., the device 1060 of FIG. 10A.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004. One or more of the spiking neurons of the block 1010 may be configured to encode input 1002 into optical flow, as described in co-owned and co-pending U.S. patent application Ser. No. 13/689,717, entitled "APPARATUS AND METHODS FOR OBJECT DETECTION VIA OPTICAL FLOW CANCELLATION", filed Nov. 30, 2012, incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the one or more implementations represented by FIG. 10B, individual detectors of the same hierarchical layer may be denoted by a "_n" designator, such that e.g., the designator 1042_1 denotes the first detector of the layer 1042. Although only two detectors (1042_1, 1042_n) are shown in FIG. 10B for clarity, it will be appreciated that the encoder may be coupled to any number of detector nodes that is compatible with the detection apparatus hardware and software limitations. Furthermore, a single detector node may be coupled to any practical number of encoders.

In various implementations, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in co-owned U.S. patent application Ser. No. 12/869,573, filed Aug. 26, 2010 and entitled "SYSTEMS AND METHODS FOR INVARIANT PULSE LATENCY CODING", now patented as U.S. Pat. No. 8,315,305 on Nov. 20, 2012, co-owned U.S. patent application Ser. No. 12/869,583, filed Aug. 26, 2010, entitled "INVARIANT PULSE LATENCY CODING SYSTEMS AND METHODS", now patented as U.S. Pat. No. 8,467,623 on Jun. 18, 2013, co-owned and co-pending U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", co-owned and co-pending U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 10B, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra. In such implementations, individual subsequent layers of detectors may be configured to receive signals (e.g., via connections 1058) from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with appropriate conduction delays to the detectors 1052. In some implementations, the detector cascade shown in FIG. 10B may contain any practical number of detector nodes and detector banks determined, inter cilia, by the software/hardware resources of the detection apparatus and complexity of the objects being detected.

The exemplary sensory processing apparatus 1000 illustrated in FIG. 10B may further comprise one or more lateral connections 1046, configured to provide information about activity of neighboring neurons to one another.

In some implementations, the apparatus 1000 may comprise feedback connections 1006, 1056, configured to communicate context information from detectors within one hierarchy layer to previous layers, as illustrated by the feedback connections 1056_1, 1056_2 in FIG. 10B. In some implementations, the feedback connection 1006 may be configured to provide feedback to the encoder 1010 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Output of the processing apparatus network may be provided via one or more connections 1058.

FIG. 10A depicts a mobile robotic apparatus that may be configured with an adaptive controller in accord with the one or more network implementations illustrated in FIG. 10B, supra. The robotic apparatus 1060 may comprise a camera 1066. The camera 1066 may be characterized by a field of view 1068. The camera 1066 may provide information associated with objects within the field-of-view. In some implementations, the camera 1066 may provide frames of pixels of luminance, refreshed at 25 Hz frame rate. However, it will be appreciated that, in some implementations, other frame rates may be used (whether regular or aperiodic).

One or more objects (e.g., a floor 1070, a stationary object 1074 and a moving object 1076) may be present in the camera field of view. The motion of the objects may result in a displacement of pixels representing the objects within successive frames, such as described in co-owned and co-pending U.S. patent application Ser. No. 13/689,717, entitled "APPARATUS AND METHODS FOR OBJECT DETECTION VIA OPTICAL FLOW CANCELLATION", filed Nov. 30, 2012, incorporated, supra.

When the robotic apparatus 1060 is in motion, such as shown by arrow 1064 in FIG. 10A, the optical flow estimated from the image data may comprise the self-motion component and the object motion component. By way of a non-limiting example, the optical flow measured by the rover of FIG. 10A may comprise one or more of (i) self-motion components of the stationary object 1078 and the boundary (e.g., the component 1072 associated with the floor boundary); (ii) component 1080 associated with the moving objects 116 that comprises a superposition of the optical flow components due to the object displacement and displacement of the robotic apparatus, and/or other components.

Figure 11A:
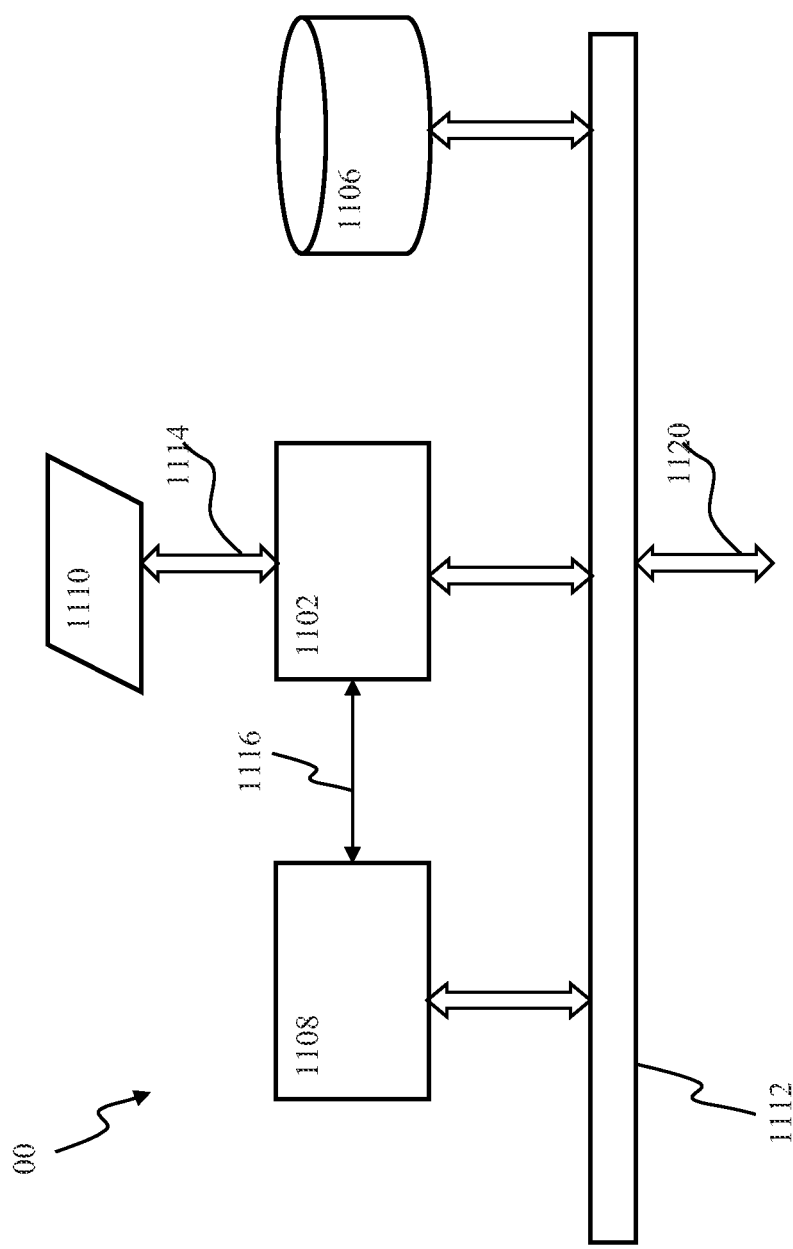
FIG. 11A is a block diagram illustrating a neuromorphic computerized system useful for, inter alia, operating a parallel network configured using multi-threaded parallel network development methodology, in accordance with one or more implementations.
Figure 11B:
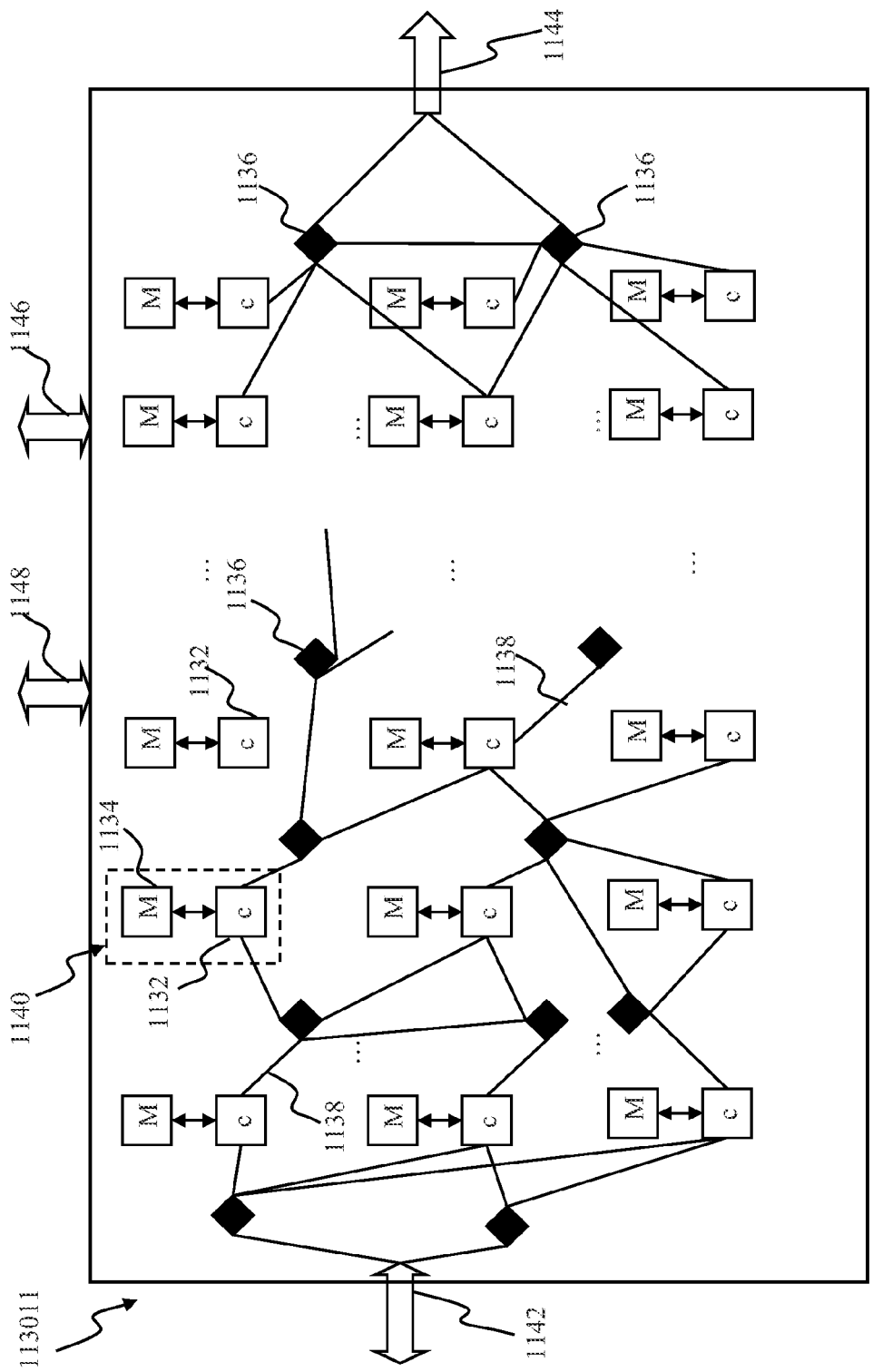
FIG. 11B is a block diagram illustrating cell-type neuromorphic computerized system architecture useful with, inter alia, multi-threaded parallel network development methodology, in accordance with one or more implementations.
Figure 11C:
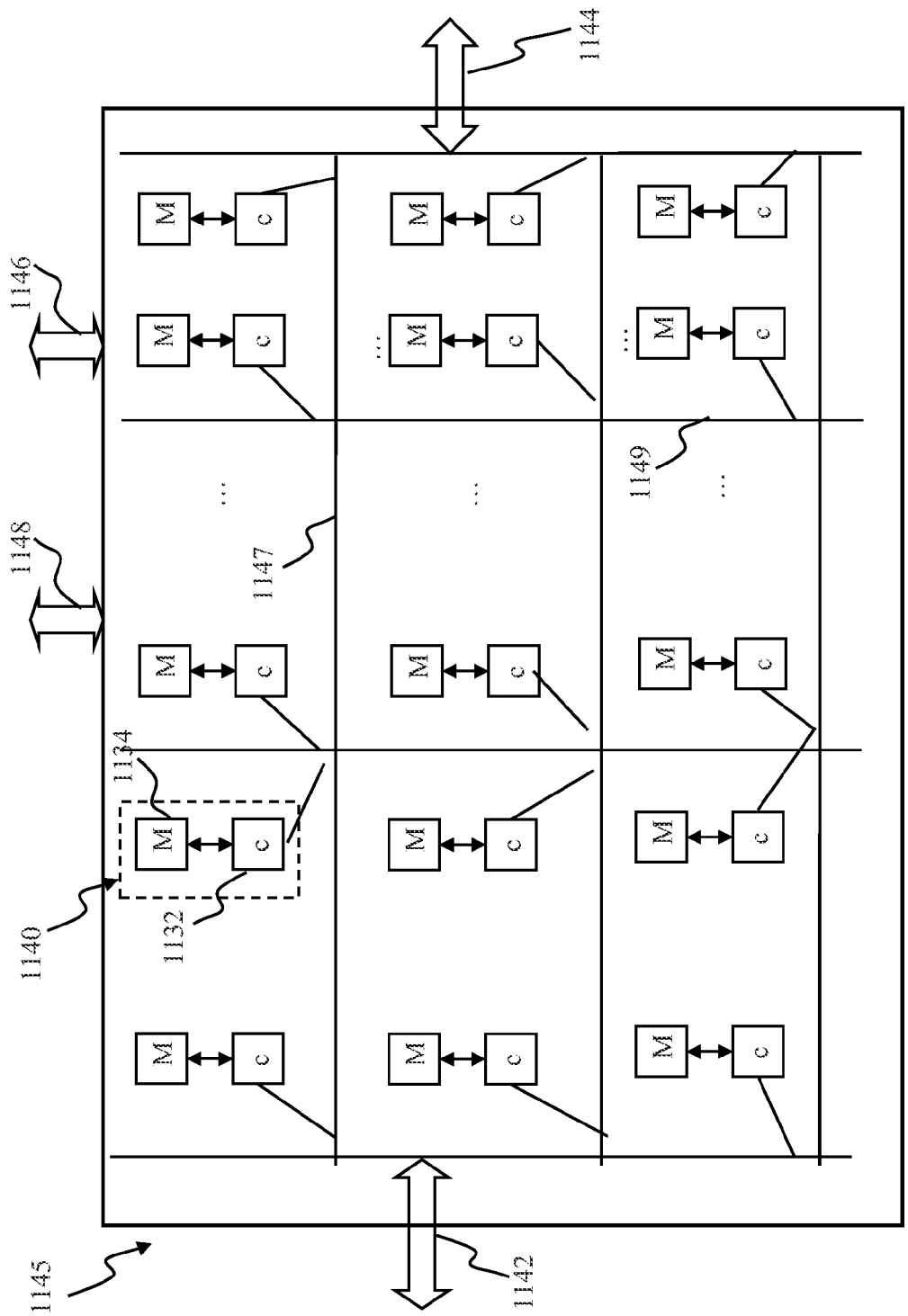
FIG. 11C is a block diagram illustrating a hierarchical neuromorphic computerized system architecture useful with, inter cilia, multi-threaded parallel network development methodology, in accordance with one or more implementations.

Various exemplary computerized apparatus configured to execute machine code obtained using multi-threaded parallel network development methodology set forth herein are now described with respect to FIGS. 11A-11C, A computerized neuromorphic processing system, consistent with one or more implementations, for use with an adaptive robotic controller described, supra, is illustrated in FIG. 11A. The computerized system 1100 of FIG. HA may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices providing sensory input to the pre-processing block (e.g., described with respect to operation 314 in FIG. 3).

The system 1100 further may comprise a random access memory (RAM) 1108, configured to store neuronal states and connection parameters and to facilitate synaptic updates. In some implementations, synaptic updates may be performed according to the description provided in, for example, in co-pending U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra.

In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter glia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or cloud computing services). Various user input/output interfaces may be similarly applicable to implementations of the disclosure including, for example, an LCD/LED monitor, touch-screen input and display device, speech input device, stylus, light pen, trackball, and/or other devices.

Referring now to FIG. 11B, one implementation of neuromorphic computerized system configured to implement classification mechanism using a spiking network is described in detail. The neuromorphic processing system 1130 of FIG. 11B may comprise a plurality of processing blocks (microblocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in co-owned U.S. patent application Ser. No. 13/487,576 entitled "DYNAMICALLY RECONFIGURABLE STOCHASTIC LEARNING APPARATUS AND METHODS", filed Jun. 4, 2012, now patented as U.S. Pat. No. 9,015,092 on Apr. 21, 2015, incorporated herein by reference in its entirety.

External memory may include one or more of a Flash drive, a magnetic drive, and/or other external memory.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
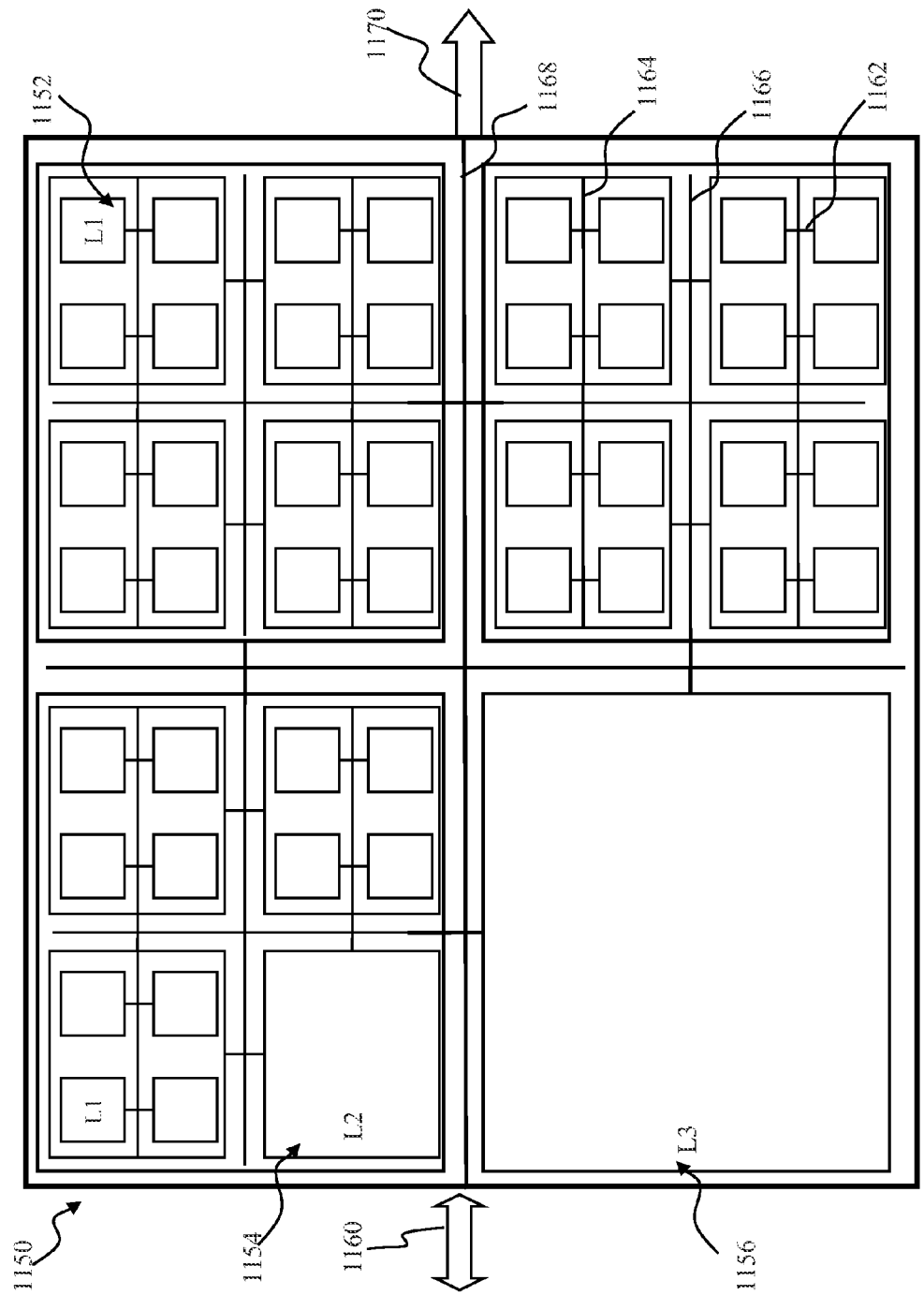
FIG. 11D is a block diagram illustrating cell-type neuromorphic computerized system architecture useful with, inter alia, multi-threaded parallel network development methodology, in accordance with one or more implementations.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11*d*. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in co-owned U.S. patent application Ser. No. 13/487,576, entitled "DYNAMICALLY RECONFIGURABLE STOCHASTIC LEARNING APPARATUS AND METHODS", filed Jun. 4, 2012 and now patented as U.S. Pat. No. 9,015,092 on Apr. 21, 2015, incorporated, supra.

In one or more implementations, one or more portions of the apparatus 1150 may be configured to operate one or more learning rules, as described for example in co-owned U.S. patent application Ser. No. 13/487,576 entitled "DYNAMICALLY RECONFIGURABLE STOCHASTIC LEARNING APPARATUS AND METHODS", filed Jun. 4, 2012, now patented as U.S. Pat. No. 9,015,092 on Apr. 21, 2015, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

Figure 12:
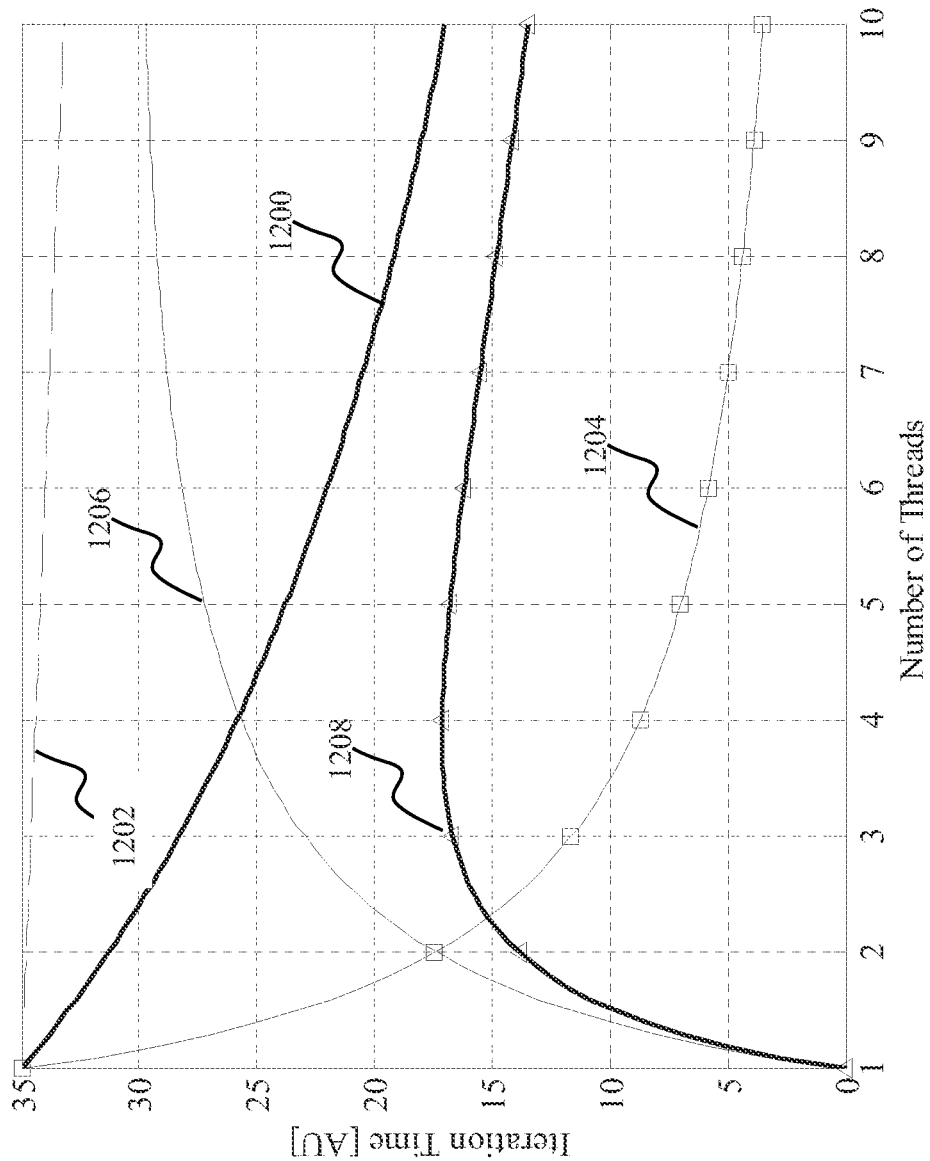
FIG. 12 is a plot illustrating performance results for the operation of the adaptive controller network of FIG. 9, in operable accordance with some implementations of multithreaded network operation.

FIG. 12 presents data obtained by the Assignee thereof illustrating performance results of the adaptive controller network of, e.g., FIG. 9, operable in accordance with one or more implementations of the multithreaded network operation principles and architectures described herein. The network user in simulations described with respect to FIG. 12 is comprised of 30,000 spiking neurons operable in accordance with a spike-response process, and 300,000 synapses operable in accordance with spike-timing dependent plasticity mechanism. Data illustrated in FIG. 12 were obtained using a conventional computer with 16-core Intel Core 7 CPU capable of running up to 16 threads simultaneously with one another.

In some implementations, the neuron process may comprise deterministic and/or stochastic process as described, for example, in co-owned and co-pending U.S. patent application Ser. No. 13/487,533, entitled "SYSTEMS AND APPARATUSES FOR IMPLEMENTING TASK-SPECIFIC LEARNING USING SPIKING NEURONS", filed Jun. 4, 2012, incorporated supra. In one or more synapse implementations, the STDP mechanisms may comprise one or more plasticity, such as rules comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012 and now patented as U.S. Pat. No. 9,098,811 on Aug. 4, 2015; conditional plasticity rules described in co-owned U.S. patent application Ser. No. 13/541,531, entitled "CONDITIONAL PLASTICITY SPIKING NEURON NETWORK APPARATUS AND METHODS", filed Jul. 3, 2012, now patented as U.S. Pat. No. 9,111,215 on Aug. 18, 2015; plasticity configured to stabilize neuron response rate as described in co-owned and co-pending U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, now patented as U.S. Pat. No. 8,972,315 on Mar. 3, 2015, co-owned U.S. patent application Ser. No. 13/660,945, entitled "MODULATED PLASTICITY APPARATUS AND METHODS FOR SPIKING NEURON NETWORKS", filed Oct. 25, 2012 and now patented as U.S. Pat. No. 9,111,226 on Aug. 18, 2015; and co-owned and co pending U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in co-pending U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

The network may be operable in accordance with one or more multithreaded network execution mechanisms described above with respect to FIGS. 4A-4C, 5A-5C, and 7A-7B. Curve 1200 of FIG. 12 depicts execution time of single network iteration as a function of number of threads. The network operation corresponding to the data of curve 1200 may comprise, e.g., operations at rows 540, 541, 543, 545, 547, 549 described with respect to FIG. 5B.

Broken line curve 1202 of FIG. 12 depicts execution time of single network iteration as a function of number of threads obtained using methodology of the prior art and shown for comparison. The network operation corresponding to the data of curve 1202 may comprise, e.g., operations at rows 120, 121, 122, 123, 124, 125, 126, 127, 128, 129 described with respect to FIG. 1.

Curve 1204, depicted with open squares, depicts a zero-overhead multithreaded network operation wherein the network iteration duration scales inversely proportionally with the number of execution threads ~1/nThreads. As used herein, the term 'zero-overhead' is used to describe multithreaded network operation wherein use of additional threads for executing the network may not add non-network related (e.g., overhead) processing load of the computer system.

Curve 1206, illustrates thread execution overhead cost of the prior art, obtained as difference of thread execution time between the curve 1204 and the curve 1202 data.

Curve 1208, illustrates thread execution overhead cost in accordance with one or more implementations of the multithreaded network execution methodology of the present disclosure. Data shown by the curve 1208 may be obtained based difference of thread execution time between the curve 1200 and the zero-overhead curve 1202 data.

Comparing the thread execution overhead of the methodology of the present disclosure (curve 1208) with the thread execution overhead of the prior art, it may be seen that one or more network execution optimizations mechanisms described herein (e.g., with respect to FIGS. 4A-4C, 5A-5C, and 7A-7B) may result in reduction of thread execution overhead as the number of threads increases (e.g., above 3 in implementation depicted in FIG. 12). In contrast, the thread execution overhead of the prior art growth with the number of threads.

The multi-threaded parallel network development methodology set forth herein may advantageously reduce computational overhead that may be associated with executing multiple threads in parallel, as compared to the prior art. The computational overhead may arise be due to one or more of switching to kernel mode for implementing synchronization, transmission of the synchronization data multiple physical processors, repetitive checking of synchronization flags, memory protection for simultaneous access for synchronization flags, and/or other synchronization overhead.

For a given hardware platform capabilities, reduction of thread execution overhead may be leveraged, for example, for a capability to operate larger networks (e.g., comprising more networks and/or synapses), more complex networks (e.g., comprising more accurate neuron and/or synapse processes description), obtain more accurate results (e.g., lower error), and/or reduce iteration time thereby achieving faster convergence.

For a given network, reduction of thread execution overhead may reduce energy use by the processing apparatus due to, e.g., reduced iteration time, reduced hardware complexity, size, and/or cost; and/or ability to iterate network more frequency, compared to the prior art realizations. Faster network operation may be used to, inter cilia, enable more rapid training of robots, faster data processing, broader exploration during learning, and/or reduce network operation time.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles and architectures described herein. This description is in no way meant to be limiting, but rather should be taken as illustrative of the general principles of the disclosure. The scope of the disclosure should be determined with reference to the claims.

What is claimed:

1. A method of operating a network comprising a plurality of nodes and a plurality of node-to-node connections by a computerized apparatus, the method comprising:
    configuring individual ones of the plurality of connections, each adapted to communicate data from a source node to a target node of the plurality of nodes, and to allow access to memory associated with the target node;
    partitioning the plurality of nodes into at least a first node portion and a second node portion, individual ones of the plurality of nodes being characterized by a node memory;
    selecting a first portion of the plurality of connections configured to provide an input to individual nodes of the first node portion; and
    selecting a second portion of the plurality of connections configured to provide the input to individual nodes of the second node portion;
    wherein the first node portion and the first portion of the plurality of connections are assigned to a first parallel executor; and
    wherein the second node portion and the second portion of the plurality of connections are assigned to a second parallel executor;
    wherein:
        an operation of the first portion of the plurality of connections and the first node portion by the first parallel executor is characterized by first and second operation stages configured to be executed immediately sequentially with one another;
        an operation of the second portion of the plurality of connections and the second node portion by the second parallel executor is characterized by third and fourth operation stages configured to be executed immediately sequentially with one another;

the first, second, third, and fourth operation stages have varied execution times; and an operation of a combination of the first and the second operation stages is configured to occur in parallel with an operation of a combination of the third and fourth operation stages.

2. The method of claim 1, wherein the operation by the first parallel executor of the second operation stage associated with the first node portion is configured to overlap in time at least partly with the operation by the second parallel executor of the fourth stage associated with the second node portion.

3. The method of claim 1, further comprising:
preventing individual ones of the plurality of connections from accessing memory associated with the source node;
wherein communication of the data from the source node to the target node comprises communicating one or more data packets to the target node generated by the source node.

4. The method of claim 1, wherein:
the first parallel executor and the second parallel executor respectively comprise first and second hardware processor cores of the computerized apparatus; and
the first and second hardware processor cores are configured to be operable contemporaneously with one another.

5. The method of claim 4, wherein:
the first parallel executor comprises a first thread process comprising a first sequence of machine executable instructions configured to be executed by the first hardware processor core;
the second parallel executor comprises a second thread process comprising a second sequence of machine executable instructions configured to be executed by the second hardware processor core;
execution of the first sequence of machine executable instructions is configured to be managed independently from execution of the second sequence of machine executable instructions; and
the execution of the first sequence of machine executable instructions by the first hardware core is configured to overlap in time with the execution of second sequence of machine executable instructions by the second hardware core.

6. The method of claim 5, wherein:
a scheduler comprises an operating system process comprising a plurality of machine executable instructions configured to be executed by the computerized apparatus; and
the scheduler is configured to schedule the execution of the first sequence and the execution of the second sequence such that the overlap in time is characterized by a duration that is configured to comprise at least 10% of an execution duration associated with the execution of the first sequence.

7. The method of claim 5, wherein:
a scheduler comprises a hardware block of the computerized apparatus; and
the scheduler is configured to schedule the execution of the first sequence and the execution of the second sequence such that the overlap in time is characterized by a duration that is configured to comprise at least 50% of an execution duration associated with the execution of the first sequence.

8. The method of claim 5, wherein:
individual ones of the plurality of connections are characterized by a connection efficacy based on a timing of one or more spikes communicated via respective ones of the plurality of connections; and
the input provided into the individual nodes of the first node portion comprises a first spiking input;
the input provided into the individual nodes of the second node portion comprises a second spiking input;
the individual nodes of the first node portion comprise spiking neurons adapted to generate one or more output spikes based on a neuron excitability, each one of the spiking neurons characterized by a corresponding excitability based on at least one of the one or more spikes of the first spiking input; and
the individual nodes of the second node portion comprise spiking neurons adapted to generate one or more output spikes based on the neuron excitability, an excitability of the spiking neurons of the second node portion being based on at least one of the one or more spikes of the second spiking input.

9. The method of claim 8, wherein:
the operation of the network is characterized by a plurality of iterations, operations of a given iteration of the plurality of iterations being executed by the first thread comprising first stage instructions and second stage instructions, the operations of the given iteration of the plurality of iterations being executed by the second thread, comprising fourth stage instructions and third stage instructions;
for a given iteration:
A) execution, by the first thread, of the first stage instructions determines the connection efficacy of individual ones of the first portion of the plurality of connections based on one or more first spikes of the first spiking input corresponding to a preceding iteration;
B) execution, by the second thread, of the third stage instructions determines the connection efficacy of individual ones of the second portion of the plurality of connections based on one or more second spikes of the second spiking input corresponding to the preceding iteration; and
C) execution, by the first thread process, of second stage instructions determines the neuron excitability of the individual nodes of the first node portion based on the connection efficacy of at least one connection of the first portion of the plurality of connections;
execution of the operation C is configured to commence subsequent to completion of the operation A, the commencement being characterized by an absence of thread synchronization between the operation C and the operation B; and
the partitioning of the plurality of nodes enables an omission of the thread synchronization.

10. An apparatus configured to operate a network comprising a plurality of connections between a plurality of nodes, the apparatus comprising:
a first memory and a second memory; and
a non-transitory computer-readable medium configured to store at least one computer program thereon, the computer program comprising a plurality of instructions configured to, when executed:
partition the plurality of nodes into at least a first node portion and a second node portion;
operate a first portion of the plurality of connections and the first node portion, the operation of the first portion comprising first and second operation stages configured to be executed immediately sequentially with each other;
operate a second portion of the plurality of connections and the second node portion, the operation of the second portion comprising third and fourth operation stages configured to be executed immediately sequentially with each other; and
operate a combination of the first and second operation stages in parallel with a combination of the third and fourth operation stages;
wherein for a given iteration of a plurality of iterations:
the operation of the first node portion is based on first data configured to be stored in the first memory, the first data being based on the operation of the second node portion during a preceding iteration of the plurality of iterations; and
the operation of the second node portion comprises storage of second data in the second memory, the second data being configured to be used during the operation of the first node portion during a subsequent iteration of the plurality of iterations.

11. The apparatus of claim 10, further comprising:
a first parallel executor configured to operate the first and second operation stages; and
a second parallel executor configured to operate the third and fourth operation stages.

12. The apparatus of claim 11, wherein the operation by the first parallel executor of the second operation stage is configured to overlap in time at least partly with the operation by the second parallel executor of the fourth operation stage.

13. The apparatus of claim 10, wherein the plurality of instructions are further configured to, when executed:
configure individual ones of the plurality of connections, each adapted to communicate data from a source node to a target node of the plurality of nodes, and to allow access to memory associated with the target node.

14. The apparatus of claim 13, wherein plurality of instructions are further configured to, when executed:
prevent the individual ones of the plurality of connections from accessing memory associated with the source node;
wherein the communication of the data from the source node to the target node comprises communication of one or more data packets to the target node generated by the source node.

15. The apparatus of claim 10, wherein:
the first parallel executor and the second parallel executor respectively comprise first and second hardware processor cores of the apparatus; and
the first and second hardware processor cores are configured to be operable contemporaneously with one another.

16. An apparatus configured to operate a network comprising a plurality of nodes and a plurality of node-to-node connections by a computerized apparatus, the apparatus comprising:
means for configuring individual ones of the plurality of connections, each of the plurality of connections being adapted to communicate data from a source node to a target node of the plurality of nodes, and to allow access to memory associated with the target node;
means for partitioning the plurality of nodes into at least a first node portion and a second node portion, individual ones of the plurality of nodes being characterized by a node memory;
means for selecting a first portion of the plurality of connections configured to provide an input to individual nodes of the first node portion; and
means for selecting a second portion of the plurality of connections configured to provide the input to individual nodes of the second node portion;
wherein:
the first node portion and the first portion of the plurality of connections are assigned to a first parallel executor;
the second node portion and the second portion of the plurality of connections are assigned to a second parallel executor
an operation of the first portion of the plurality of connections and the first node portion by the first parallel executor is characterized by first and second operation stages configured to be executed immediately sequentially with one another;
an operation of the second portion of the plurality of connections and the second node portion by the second parallel executor is characterized by third and fourth operation stages configured to be executed immediately sequentially with one another;
the first, second, third, and fourth operation stages have varied execution times; and
an operation of a combination of the first and the second operation stages is configured to occur in parallel with an operation of a combination of the third and fourth operation stages.

17. The apparatus of claim 16, wherein:
the first parallel executor and the second parallel executor respectively comprise first and second hardware processor cores of the computerized apparatus; and
the first and second hardware processor cores are configured to be operable contemporaneously with one another.

18. The apparatus of claim 16, further comprising:
means for preventing the individual ones of the plurality of connections from accessing memory associated with the source node;
wherein communication of the data from the source node to the target node comprises communicating one or more data packets to the target node generated by the source node.

19. The apparatus of claim 16, wherein one or more of the operation of the first portion of the plurality of connections and the first node portion by the first parallel executor, and the operation of the second portion of the plurality of connections and the second node portion by the second parallel executor comprises one or more hold stages each configured to initialize or complete portions of the operation.

* * * * *